(12) United States Patent
Wurzbacher et al.

(10) Patent No.: US 11,007,470 B2
(45) Date of Patent: May 18, 2021

(54) LOW-PRESSURE DROP STRUCTURE OF PARTICLE ADSORBENT BED FOR IMPROVED ADSORPTION GAS SEPARATION PROCESS

(71) Applicant: CLIMEWORKS AG, Zurich (CH)

(72) Inventors: Jan André Wurzbacher, Zurich (CH); Nicolas Repond, Zurich (CH); Tobias Ruesch, Zurich (CH); Sebastian Sauerbeck, Zurich (CH); Christoph Gebald, Zurich (CH)

(73) Assignee: CLIMEWORKS AG, Zurich (CH)

( * ) Notice: Subject to any disclaimer, the term of this patent is extended or adjusted under 35 U.S.C. 154(b) by 217 days.

(21) Appl. No.: 16/347,037

(22) PCT Filed: Nov. 1, 2017

(86) PCT No.: PCT/EP2017/077945
§ 371 (c)(1),
(2) Date: May 2, 2019

(87) PCT Pub. No.: WO2018/083109
PCT Pub. Date: May 11, 2018

(65) Prior Publication Data
US 2019/0255480 A1 Aug. 22, 2019
US 2020/0001224 A9 Jan. 2, 2020

Related U.S. Application Data

(63) Continuation-in-part of application No. 15/667,399, filed on Aug. 2, 2017, now Pat. No. 10,427,086, (Continued)

(30) Foreign Application Priority Data

Apr. 18, 2013 (EP) .................................... 13164230
Nov. 4, 2016 (EP) .................................... 16197203

(51) Int. Cl.
*B01D 53/04* (2006.01)

(52) U.S. Cl.
CPC ...... *B01D 53/0438* (2013.01); *B01D 53/0407* (2013.01); *B01D 53/0462* (2013.01); *B01D 2257/504* (2013.01)

(58) Field of Classification Search
CPC ............ B01D 53/0407; B01D 53/0438; B01D 53/0462; B01D 53/0415; B01D 53/0446;
(Continued)

(56) References Cited

U.S. PATENT DOCUMENTS 3,354,623 A * 11/1967 Keller .................. B01D 46/125
55/484
3,873,287 A    3/1975 Barnebey
(Continued)

FOREIGN PATENT DOCUMENTS

EP       0 766 993 A2    4/1997
WO    2010/022339 A2    2/2010
(Continued)

OTHER PUBLICATIONS

International Search Report for PCT/EP2017/077945 dated Mar. 27, 2018 (PCT/ISA/210).
(Continued)

*Primary Examiner* — Frank M Lawrence, Jr.
(74) *Attorney, Agent, or Firm* — Sughrue Mion, PLLC

(57) ABSTRACT

A gas separation unit for the separation of a first gas from a mixture containing said first gas as well as further gases by a cyclic adsorption/desorption process using a loose particulate sorbent material for gas adsorption. The particulate sorbent material is arranged in at least two stacked layers (5) that are mounted on a stiff rectangular circumferential frame (7). A plurality of tubes (11) is provided for a heat exchange fluid within the frame (7). The tubes (11) are in thermal
(Continued)

contact with a plurality of sheets (9) of metal which are arranged essentially perpendicular to a main plane of the frame (7) and perpendicular to the tubes (11). The sheets (9) extend in a continuous manner between a first pair of mutually parallel metal profiles (7') and are provided with a plurality of holes (10) through which the plurality of tubes (11) penetrate.

26 Claims, 13 Drawing Sheets

Related U.S. Application Data which is a continuation-in-part of application No. 14/785,152, filed as application No. PCT/EP2014/057185 on Apr. 9, 2014, now Pat. No. 9,751,039.

(58) Field of Classification Search
CPC ............ B01D 53/0476; B01D 2253/20; B01D 2253/25; B01D 2253/34; B01D 2253/202; B01D 2257/504; B01D 2258/0283; B01D 2258/06; F24F 1/126; F24F 1/32; F24F 2255/12; F24F 9/26; B01J 20/20; B01J 20/24; B01J 20/25; B01J 20/302; B01J 20/34; B01J 20/28004; B01J 20/28023; B01J 20/28052; Y02C 10/08
USPC ............ 95/139; 96/121, 129, 130, 134, 146
See application file for complete search history.

(56) References Cited

U.S. PATENT DOCUMENTS

| | | | | |
|---|---|---|---|---|
| 5,964,927 | A | * | 10/1999 | Graham ............ B01D 53/0446 96/121 |
| 6,533,847 | B2 | * | 3/2003 | Seguin ............... B01D 53/0415 55/518 |
| 8,163,066 | B2 | | 4/2012 | Eisenberger |
| 8,202,350 | B2 | | 6/2012 | Asaro et al. |
| 2009/0120288 | A1 | | 5/2009 | Lackner et al. |
| 2011/0146487 | A1 | | 6/2011 | Celik et al. |
| 2012/0174778 | A1 | | 7/2012 | Eisenberger |

FOREIGN PATENT DOCUMENTS

| | | |
|---|---|---|
| WO | 2010/027929 A1 | 3/2010 |
| WO | 2010/091831 A1 | 8/2010 |
| WO | 2012/168346 A1 | 12/2012 |
| WO | 2014/170184 A1 | 10/2014 |
| WO | 2015/123454 A1 | 8/2015 |
| WO | 2016/005226 A1 | 1/2016 |

OTHER PUBLICATIONS

Written Opinion for PCT/EP2017/077945 dated Mar. 27, 2018 (PCT/ISA/237).

* cited by examiner

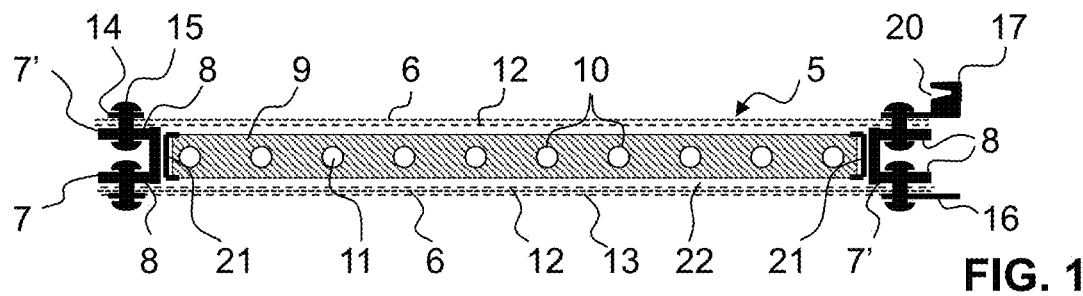

a)
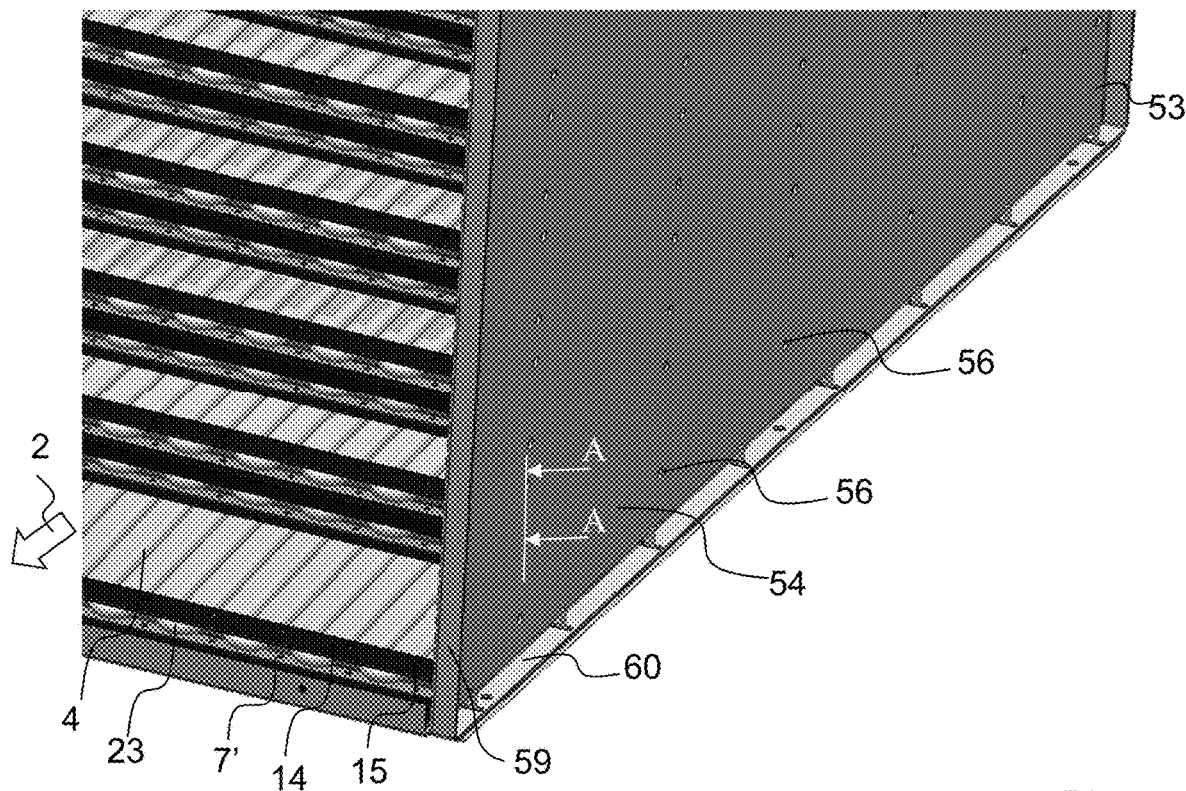
b)
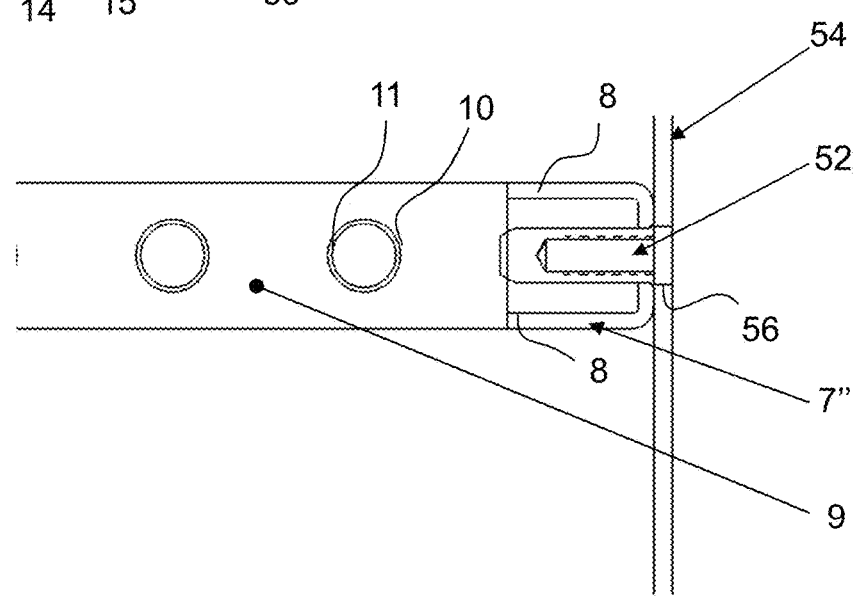
FIG. 15

LOW-PRESSURE DROP STRUCTURE OF PARTICLE ADSORBENT BED FOR IMPROVED ADSORPTION GAS SEPARATION PROCESS

This application is a National Stage of International Application No. PCT/EP2017/077945 filed Nov. 1, 2017, claiming priority based on European Patent Application No. 16197203.9 filed Nov. 4, 2016, which is a Continuation-in-Part of U.S. patent application No. 15/667,399 filed Aug. 2, 2017, which is a Continuation-in-Part of U.S. application No. 14/785,152 filed Oct. 16, 2015, which is a National Stage of International Application No. PCT/EP2014/057185 filed April 9, 2014, which claims priority to European Patent Application No. 13164230.8 filed Apr. 18, 2013.

TECHNICAL FIELD

The present invention relates to sorbent bed structures for gas separation processes and the use of such structures for gas separation, for example for the separation/capture of $CO_2$ from gas streams.

PRIOR ART

Gas separation by adsorption has many different applications in industry, for example removing a specific component from a gas stream, where the desired product can either be the component removed from the stream, the remaining depleted stream, or both. Thereby both, trace components as well as major components of the gas stream can be targeted by the adsorption process.

One important application is capturing carbon dioxide ($CO_2$) from gas streams, e.g., from flue gases, exhaust gases, industrial waste gases, biogas or atmospheric air.

Capturing $CO_2$ directly from the atmosphere, referred to as direct air capture (DAC), is one of several means of mitigating anthropogenic greenhouse gas emissions and has attractive economic perspectives as a non-fossil, location-independent $CO_2$ source for the commodity market and for the production of synthetic fuels. The specific advantages of $CO_2$ capture from the atmosphere include: (i) DAC can address the emissions of distributed sources (e.g. cars, planes), which account for a large portion of the worldwide greenhouse gas emissions and can currently not be captured at the site of emission in an economically feasible way; (ii) DAC can address emissions from the past and can therefore create truly negative emissions; (iii) DAC systems do not need to be attached to the source of emission but are rather location independent and can for example be located at the site of further $CO_2$ processing; and (iv) if $CO_2$ that was captured from the atmosphere is used for the production of synthetic hydrocarbon fuels from renewable energy sources, truly non-fossil fuels for the transportation sector can be obtained, that create no or very few net $CO_2$ emissions to the atmosphere.

Several DAC methods have recently been developed based on various technological approaches. For example, U.S. Pat. No. 8,163,066 B2 discloses carbon dioxide capture/regeneration structures and techniques; US 2009/0120288 A1 discloses a method for removal of carbon dioxide from air; US 2012/0174778 discloses a carbon dioxide capture/regeneration method using a vertical elevator; and WO2010022339 discloses a carbon dioxide capture method and facility.

One particular approach is based on a cyclic adsorption/desorption process on solid, chemically functionalized sorbent materials. For example, in WO2010/091831 a structure based on amine functionalized solid sorbent materials together with a cyclic adsorption/desorption process using this material for the extraction of carbon dioxide from ambient air is disclosed. Therein, the adsorption process takes place at ambient conditions at which air is streamed through the sorbent material and a portion of the $CO_2$ contained in the air is chemically bound at the amine functionalized surface of the sorbent. During the subsequent desorption, the material is heated to about 50-110° C. and the partial pressure of carbon dioxide surrounding the sorbent is reduced by applying a vacuum or exposing the sorbent to a purge gas flow. Thereby, the previously captured carbon dioxide is removed from the sorbent material and obtained in a concentrated form.

In WO2012/168346, a sorbent material based on amine functionalized cellulose is disclosed, which can be used for the above described process.

Generally, for adsorption-based gas separation processes, configurations of the sorbent material are desired which impose little pressure drop on the gas flow in order to minimize the energy required for gas pumping and at the same time achieve maximum contact between the sorbent and the gas stream in order to maximize the mass transfer rates of the components to be removed from the gas stream. Typical configurations include packed bed columns or fluidized beds with typical lengths of several ten centimeters to several meters, which typically impose pressure drops of several thousand Pascal up to several bars on the gas flow. Such a structure is e.g. disclosed in WO 2014/170184.

The requirement on the pressure drop can become even more severe, if trace components are removed from a gas stream. In particular, all DAC approaches have one major challenge in common which are the very large air volumes that have to be passed through any capture system in order to extract a certain amount of $CO_2$ from the air. The reason for this is the very low concentration of $CO_2$ in the atmospheric air, currently between 390 and 400 ppm, i.e., roughly 0.04%. Thus, in order to extract one metric ton of $CO_2$ from the atmosphere, at least about 1'400'000 cubic meters of air have to be passed through the capture system. This in turn means that economically feasible capture systems must have a very low pressure drop on the air flow passing through them. Otherwise the energy requirements for air pumping will render the system uneconomical. However, any low-pressure drop configuration should not compromise the mass transfer properties of the system.

While many materials that have promising properties for a DAC process are typically in a granular form, their arrangement in a conventional packed bed column or in a fluidized bed with a length of typically several ten centimeters to several meters will usually not be feasible, since the resulting pressure drops will exceed the tolerable limits by one or several orders of magnitude.

On the other hand, in the field of particle filters for gas streams, in particular soot particle filters for exhaust gases, channeled filter structures were developed, typically referred to as "wall flow" filters, see for example EP 0 766 993 A2. In these structures the gas flow enters the structure through inlet channels, passes porous walls, at which the soot particles are trapped, and exits the structure through outlet channels.

Monolithic structures comprising sorbent materials were also developed in the context of gas separation and adsorption (e.g. WO2010/027929 A1, U.S. Pat. No. 8,202,350 B2).

SUMMARY OF THE INVENTION

It is therefore an object of the present invention to provide an improved gas separation unit for the separation of at least a first gas from a mixture containing said first gas as well as further gases different from the first gas by using a cyclic adsorption/desorption process using a loose particulate sorbent material for gas adsorption. Typically the loose particulate sorbent material for gas adsorption is a particulate material which at least at its surface is amine-functionalized, e.g. weak base ion exchange resins, for capture of the first gas, in particular in case the first gas is carbon dioxide. Examples of such materials are e.g. disclosed in WO2010091831 or WO2016005226. The loose particular sorbent material is can e.g. be an amine-modified particular material, preferably based on a weak base ion exchange resin, specifically polystyrene matrix material modified with amine groups, specially primary amine groups, or based on cellulose, more preferably based one amine-modified nano-fibrilated cellulose, in each case preferably with an average particle diameter in the range of 60 to 1200 μm, for the adsorption of carbon dioxide. It can however also be another material in particulate form, which is able to adsorb CO2 upon passage of a gas stream through the material and able to release the CO2 again if corresponding different conditions (mainly change in at least one of pressure, temperature, humidity) are chosen. In accordance with the present invention, said particulate sorbent material is arranged in at least two stacked layers (forming a stack, typically of a plurality of such layers, normally at least 4, preferably at least 10, particularly preferably in the range of 25-40 or 25-60 layers are arranged in such a stack), wherein each layer comprises two sheets of a flexible fabric material which is gas permeable but impermeable to the loose particulate sorbent material, and which sheets are arranged essentially parallel defining an inlet face of the layer and an outlet face of the layer.

When talking about stacked layers or a stack, this shall not imply that the individual layers are necessarily on top of one-another and/or contacting each other. The layers in such a stack are arranged adjacent (but with a distance between) and neighboring, and their main planes are arranged parallel, essentially parallel or with a defined inclination angle of not more than 10° (angle between plane normals).

The orientation of such a stack can be such that the planes of the individual layers are essentially horizontal planes. Between the layers there are therefore in this case horizontal slots for the entry of the inflow of the gas mixture and horizontal slots for the outflow of the gas depleted in CO2. Such a substantially horizontal stack configuration can be selected to avoid the formation of holes in the layers due to the motion of the sorbent material during operation. Such holes can lead to bypassing of a large portion of the main airflow as they can form a significantly lower pressure drop region.

In some cases however it has been observed that also in such a substantially horizontal configuration, hole formation can occur and a more controlled formation of holes can be realized in a vertical orientation of the stack and/or with a better homogeneity and stability of the layer surface According to another embodiment therefore the layers can be placed vertically—the complete stack is so to speak rotated 90° around the main horizontal axis of the whole unit. In other words in this orientation between the layers there are vertical slots for the entry of the inflow of the gas mixture and vertical slots for the outflow of the gas depleted in CO2. In this manner any relocation/motion of sorbent nevertheless leads to a homogenous bed due to the weight of the sorbent material and the corresponding downward motion of the particles which closes any formed holes in a self-ordering process. In order to avoid that formed holes at the upper edge of the layer lead to bypassing, a slat made preferably of aluminum can be affixed at the upper edge being oriented along the upper edge of the layer on the inflow and outflow face of the layer, in contact with the outer surface of the layer, covering and thereby blocking a portion of the layer—and any potentially formed holes—to inflow and thusly forcing all inflow through the sorbent material layer containing sufficient sorbent particles in this region. The width of the slat can be in the range of 1-25 cm or 1 to 15 cm, preferably 2-15 or 2 to 10 cm.

Also intermediate rotated stack orientations are possible, where the plane normals are oriented in a plane perpendicular to the inflow direction, e.g. orientations where the slots for the entry of the inflow of the gas mixture and slots for the outflow of the gas depleted in CO2 are between the horizontal or the vertical direction, e.g. at 45°.

Further the flexible fabric material layers are arranged with a distance in the range of 0.3-5.0 cm or in the range of 0.5-2.5 cm, and are enclosing a cavity in which the particulate sorbent material is located. The type of the flexible fabric material is chosen to be sufficiently gas/air permeable to allow optimum flow through of the gas or generally speaking the gas mixture (e.g. air), and are sufficiently tight so as to avoid that the particulate sorbent material can penetrate through these layers.

The layers of flexible fabric material are further mounted on a stiff rectangular circumferential frame structure, typically being fixed at opposite sides thereof.

Said stiff rectangular circumferential frame structure is formed by four metal profiles arranged pairwise mutually parallel, said metal profiles having pairs of legs arranged essentially parallel to said inlet face of the layer and said outlet face of the layer, respectively, and allowing for fixing said sheets circumferentially to said legs on each respective face.

Further, according to a preferred embodiment, a plurality of meandering tubes for a heat exchange fluid can be provided within said stiff rectangular circumferential frame structure and within said cavity, wherein the plurality of tubes over the non-bent portions thereof are all being arranged essentially parallel to one first pair of said mutually parallel metal profiles.

Said tubes are in thermal contact with a plurality of sheets of metal which are arranged parallel to each other and which are arranged essentially perpendicular to a main plane of the frame and perpendicular to said tubes (to the non-bent portions thereof), the tubes extend in a continuous manner between said first pair of mutually parallel metal profiles and are provided with a plurality of holes through which the plurality of tubes penetrate. The tubes of the primary heat exchange element are preferably metal tubes, preferably aluminum or copper tubes. These tubes can be provided with an inner diameter in the range of 3-20 mm, preferably in the range of 5-12 mm, and/or with an outer diameter in the range of 4-24 mm, preferably in the range of 6.2-14 mm.

The tubes of the primary heat exchange element are typically, where running parallel, spaced by a distance (x) in the range of 10-168 mm, preferably in the range of 15.5-98 mm.

The sheets of metal if forming the secondary heat exchange elements according to a preferred embodiment have a thickness in the range of 0.1-0.4 mm, preferably in the range of 0.12-0.18 mm.

The sheets of metal if forming the secondary heat exchange elements according to another preferred embodiment have a height (h), measured perpendicular to the running direction of the tubes in the range of 3-50 mm, preferably in the range of 8-22 mm.

The sheets of metal if forming the secondary heat exchange elements according to a preferred embodiment have a length being less than 20 mm, preferably less than 5 mm shorter than the distance between the respective pair of metal profiles arranged pairwise mutually parallel forming said stiff rectangular circumferential frame structure.

Preferably the sheets of metal are made of aluminum.

Typically, the sheets of metal if forming the secondary heat exchange elements are spaced by a distance (d) in the range of 1-6 mm, preferably in the range of 3.5-5.5 mm.

As concerns the dimensioning of the tubes and the metal sheets the above mentioned values are an optimum compromise allowing for good interpenetration by the particulate sorbent material, also allowing filling of the structure in the manufacturing process, and on the other hand allowing for sufficient porosity for the air passing through the layer, and allowing for an efficient as possible heat transfer process for the heating and cooling steps in the cyclic temperature swing carbon dioxide capture process.

The tubing forming the primary heat exchange pipes can also have, at least in sections, a non-circular cross-section (flattened shape). Quite specifically, the first outer diameter of the cross section of the pipes in a direction perpendicular to the plane of the layer of the stiff frame structure can be at least twice as large as the second outer diameter of the cross section of the pipes in the longitudinal direction. By providing piping which is "slim" in the plane of the layer of the stiff frame structure the pipes appearing like upright partitioning walls in the cavity, an essentially planar surface is provided at the face of adjacent pipes, allowing for most efficient attachment of and heat exchange with secondary heat exchange elements in the form of heat exchange metal sheets and/or the sorbent as will be detailed as follows.

This design of the flattened pipes results in two substantial advantages over heat exchange pipes with a circular cross section: First, the area that is available for gas flow through the planes of the sheets of flexible fabric material is much larger since a smaller portion of this flow cross-section area is blocked by the pipes. This results in reduced pressure drop on the gas flow. Second, the pipes can be spaced closer to each other compared to prior art designs with circular pipe cross sections while the area available for gas flow still remains larger compared to those prior art designs. This results in an optimized heat transfer design since the distances for heat transfer through the sorbent material between the flattened pipes is reduced.

Said flattened pipes can further be in thermal contact with sheets of metal forming the secondary heat exchange element and which are arranged essentially perpendicular to the main plane of the stiff frame structure, and which extend oscillating between pairwise adjacent flattened pipes, thereby contacting them for thermal contact. In other words these metal sheets are either wavy oscillating between adjacent flattened pipes and contacting the flat small-diameter surfaces, or zigzagging between adjacent flattened pipes and contacting the flat small-diameter surfaces.

As an alternative to the sheets of metal or in addition to these said flattened pipes can be held in place with spacers which are arranged essentially perpendicular to the main plane of the frame, and which at least extend between pairwise adjacent flattened pipes.

The unit has a gas inlet side or gas inlet manifold through which an inflow of gas mixture enters the unit and a gas outlet side or gas outlet manifold through which a gas outflow exits the unit, the gas pathway between the inflow and the outflow being confined in the unit to pass through at least one layer.

In order to avoid the accumulation of solid particulate pollutants contained in the inflow within the sorbent material layers—leading to a degradation in performance—at least one further layer of filter fabric material can be mounted upstream of the stacked sorbent material layers, such that the inflow must pass through said filter fabric material. Also the flexible fabric material layers or at least the upstream flexible fabric material layer can be selected to have the filter effect. The use of such a filter material, which will be further detailed below, in a carbon dioxide capture unit is as such and independent of the frame structure according to claim 1 an inventive aspect.

The layers are arranged in the unit such that the inflow passes through the inlet face, subsequently through the particulate sorbent material located in the cavity of the respective layer, subsequently to exit the respective layer through the outlet face to form the gas outflow, and the layers are arranged such that inlet faces of adjacent layer are facing each other enclosing gas inlet channels and such that outlet faces are facing each other enclosing gas outlet channels.

The mean distance between inlet faces and/or outlet faces defining said channels, measured in a direction essentially perpendicular to a main gas inflow direction and a main gas outflow direction, respectively, is in the range of 0.5-15 cm or 0.5-13 cm, including the situation where the layers at respective adjacent edges touch each other and are inclined relative to each other, preferably all the layers forming the stack have essentially the same distance between the respective flexible fabric sheets, so all the layers have the same height. The total frame depth $D_{ft}$ is in the range of 0.5-1.8 m or in the range of 0.75-1.25 m or 0.9-1.1 m. The frame width is $W_f$ in the range of 0.5-1.9 or in the range of 0.57-1.79 m with a preferred dimension of 1.19-1.58 m.

The corresponding layer structure as proposed is an optimum compromise as concerns pressure drop across the layer and/or stack, as concerns mechanical stiffness and rigidity of each layer, and as concerns thermal mass. Only if these properties are optimized, can the carbon dioxide capture process be carried out in an economical manner.

According to a first preferred embodiment on at least one, preferably on both sides of the plurality of tubes and plurality of metal sheets for thermal transfer, in particular in case of an essentially horizontal orientations of the planes of the layers of the stack, there is provided a grid structure, e.g. made of metal, such as aluminium, separating the flexible fabric material and the plurality of tubes and/or plurality of metal sheets.

The provision of such a metal grid offers protection of the flexible fabric material and improves the stability of the layer surface. Typically the flexible fabric material needs to be sufficiently fine meshed so as to avoid the particulate sorbent material to pass through. It is therefore preferably some kind of a nonwoven material, and such materials are often rather vulnerable. This vulnerability can be a problem in case the metal sheets have sharp edges, so the grid structures make sure the plurality of metal sheets cannot damage the flexible fabric layers on each side of each layer.

According to another preferred embodiment, on the side which in use is facing downwards, a further grid structure is provided forming the outermost layer and sandwiching the respective flexible fabric material layer. In other words on the downward facing side of the frame preferably a sandwich is attached, where the central flexible fabric layer is sandwiched between 2 grid structures. Like this sagging of the flexible fabric material layer can be avoided, and further protection can be provided. Due to the fact that in such a cyclic process also water and humidity can weaken and/or stretch and/or extend the flexible fabric layer, this can be an important additional aspect in order to provide for the possibility of using these units over an extended period of time.

Preferably, the grid structure is provided by a preferably woven metal, in particular aluminium wire mesh with a mesh width which is typically in the range of 0.7-20 mm×0.7-20 mm, preferably with a mesh width in the range of 1.0-2.5 mm×1.0-2.5 mm or in the range of 1.0-1.5 mm×1.0-1.5 mm.

Using aluminum inter alia has the advantage of good corrosion resistance while enabling lightweight construction.

By providing this structure the grid structure protects the flexible fabric layer from the sharp edges of the metal sheets of the heat exchange element on both sides thereof. As concerns the bottom further grid structure being the outermost layer this is provided to avoid sagging of the lower flexible fabric layer.

According to another preferred embodiment, the flexible fabric material, and, if present, additional grid structures, is/are fixed to the frame structure by means of slats, preferably metal slats (again preferably aluminum slats). These slats are preferably extending essentially over the full-length of the respective metal profile, and the flexible fabric material layer and, if present, additional grid structure layer(s), is/are sandwiched between the respective slat and the leg of the metal profile. Further preferably the respective slat is fixed to the respective leg by at least one, preferably a row of rivet joint connections penetrating through the slat, the layers fixed there with, and the corresponding leg of the metal profile.

This attachment provides for a tight connection in particular of the flexible fabric material over the full extension of the corresponding frame element which can be handled in production efficiently and which is also of low thermal mass.

According to another preferred embodiment, the layers of the stack of at least two layers can be held in place in the housing by at least a pair of side walls which are either arranged pairwise vertically or pairwise horizontally, and on which side walls elements are provided, which allow individual layers to be shifted into the housing in a replaceable manner, wherein preferably the elements are provided as at least one of: U-shaped profiles attached to the side wall; wedges attached to the side wall; groove elements attached to the side wall cooperating with tongue elements attached to the layer, preferably to the lateral frame of the layer.

According to yet another preferred embodiment, pairs of adjacent frame structures are provided, at facing edges on one side contacting in use (meaning that layers are inclined relative to each other) with in case of one layer thereof a tongue protrusion extending over the full width of the edge, and on the other layer thereof a corresponding counter profile providing a slot also extending over the full width of the edge. Like that by inserting said tongue of one frame into said slot in the counter profile of the adjacent frame the adjacent frame elements are mechanically fixed at this contacting edge as well as sealed relative to each other.

Preferably said tongue protrusion is realized by means of a correspondingly structured wide slat extending over and beyond the corresponding leg of the frame profile and which is at the same time also used for fixing the flexible fabric material to said leg and, if present, additional grid structures to the leg of the corresponding metal profile.

Preferably said counter profile also comprises a slat which at the same time can be used for fixing the flexible fabric material and, if present, additional grid structures to the leg of the corresponding metal profile of the adjacent frame.

By providing this groove and tongue structure at the same time a mechanical as well as tight sealing connection can be established and in addition to that the individual layers can be shifted into the stack easily in the production or replacement process.

Another preferred embodiment is characterized in that within the stiff rectangular frame structure there is provided a separate heat exchange element comprising the tubes for the heat transfer fluid as well as the metal sheets and which in itself can be provided with frame elements holding the heat exchange element together.

In other words the heat exchange element can be provided as a separate self-standing element which can be produced separately and which is then inserted into the stiff rectangular frame structure or around which the stiff rectangular frame structure is built in the manufacturing process.

The stiff rectangular circumferential frame structure can be formed by four metal profiles arranged pairwise mutually parallel, being U-shaped metal profiles having pairs of legs arranged essentially parallel to said inlet face of the layer and said outlet face of the layer, respectively.

One pair of metal profiles can be arranged with the groove portion of the respective U-shaped metal profile facing the inner side of the stiff rectangular circumferential frame structure and the other pair can be arranged with the groove portion of the respective U-shaped metal profile facing the outside of the stiff rectangular circumferential frame structure. Preferably the latter orientation of the metal profile is the one which runs perpendicular to the running direction to the tubes.

The tubes of the heat exchange element are preferably metal tubes, preferably aluminum or copper tubes. These tubes can be provided with an inner diameter in the range of 3-20 mm, preferably in the range of 5-12 mm, and/or with an outer diameter in the range of 4-24 mm, preferably in the range of 6.2-14 mm.

The tubes of the heat exchange element are typically, where running parallel, spaced by a distance (x) in the range of 10-168 mm, preferably in the range of 15.5-98 mm.

The sheets of metal according to a preferred embodiment have a thickness in the range of 0.1-0.4 mm, preferably in the range of 0.12-0.18 mm.

The sheets of metal according to another preferred embodiment have a height (h), measured perpendicular to the running direction of the tubes in the range of 3-50 mm, preferably in the range of 8-22 mm.

The sheets of metal according to a preferred embodiment have a length being less than 20 mm, preferably less than 5 mm shorter than the distance between the respective pair of metal profiles arranged pairwise mutually parallel forming said stiff rectangular circumferential frame structure.

Preferably the sheets of metal are made of aluminum.

Typically, the sheets of metal are spaced by a distance (d) in the range of 1-15 or 1-6 mm, preferably in the range of 3.5-7 mm or 4-5.5 mm.

As concerns the dimensioning of the tubes in the metal sheets the above mentioned values are an optimum compromise allowing for good interpenetration by the particulate sorbent material, also allowing filling of the structure in the manufacturing process, and on the other hand allowing for sufficient porosity for the air passing through the layer, and allowing for an efficient as possible heat transfer process for the heating and cooling steps in the cyclic temperature swing carbon dioxide capture process.

The flexible fabric material is preferably grid or a woven or nonwoven textile material, preferably based on metallic or polymeric fibres or yarns, respectively, most preferably based on fibres or yarns, respectively based on PET and/or PE, or the flexible fabric material is made from a cellulose based material, preferably a paper material.

The flexible fabric material can have a thickness in the range of 0.1-4 mm, preferably in the range of 0.15-1 mm, this in particular if it is chosen to be a nonwoven polyethylene based material.

The flexible fabric material has, preferably in the form of a polyethylene grid or nonwoven, an air permeability in the range of 2500-5000 l/m2/s, preferably in the range of 3000-4000l/m2/s. The flexible fabric material or at least the upstream facing layer thereof, or a separate upstream filter fabric material layer, has preferably the filtration properties of at least the filter class M5, preferably at least F6, more preferably F7 such that atmospheric solid particle pollutants in the PM10 and PM2.5 range can be effectively retained without entrainment into the sorbent material layer. The classification of the filter material as used herein is according to DIN EN 779, October 2012.

The filter fabric material has, in particular in case of class M5 material, preferably an air permeability in the range of 50-600 l/m2/s, preferably in the range 200-400 l/m2/s. In one embodiment, the surface area of the filter fabric material can be increased by pleating such that the cumulative surface area of the filter fabric material exposed to the gas inflow can be at least 3 times, preferably at least 6 or at least 10 times the surface area of the individual layers exposed to gas inflow thereby maintaining a pressure drop across said filter fabric material which does not exceed an allowable pressure drop for an efficient direct air capture process. The flexible fabric material can be pleated with pleat height of 1-12 mm, preferably 3-6 mm. The pleat spacing can be 0.5-5 mm preferably 1-3 mm.

According to another embodiment, the filter fabric material can be mounted to the stiff rectangular circumferential frame structure of the individual sorbent material layers, preferably in a removable fashion such that it may be exchanged when fully charged with atmospheric particle pollutants. According to yet another embodiment, the filter fabric material can be mounted on a rectangular frame structure such that said filter fabric material can be mounted and dismounted independently of the sorbent material layers when it needs to be exchanged.

According to yet another preferred embodiment within the stiff rectangular circumferential frame structure and preferably across the heat exchange element as well as the layers of flexible fabric material, and, if present, wire grid layers, there is provided a plurality of attachment elements, preferably in the form of glue or welding or soldering or center rivet connections or transverse or longitudinal slats affixed with any of these means for holding at least the flexible fabric material layers together (if attachment elements penetrate across the heat exchange element) or the flexible fabric material layer attached to the metal sheets and/or the tubing. Again this is to prevent sagging of the flexible fabric layers, improving stability and improving control over hole formation Preferably said center rivet connections each comprise a rivet tube and a rivet pin, said rivet tube penetrating through the heat exchange element and between said metal sheets, said rivet tube and rivet pin each being provided with a head being located outside of the flexible fabric material, and, if present, and outermost wire grid layer. In the production process preferably first holes are generated through the structure provided by the parallel running metal sheets, and then into these holes the rivet tube is inserted from one side, and the rivet pin is inserted from the other side.

Preferably, the outer diameter of the rivet tube of the center rivets is at least 10%, preferably at least 30% smaller than the distance (d) of the metal sheets. One reason for this is that when the corresponding structure is to be filled by the particulate sorbent material, it must be made sure that the particulate sorbent material can actually penetrate through the interspace between two adjacent metal sheets. If these pathways are blocked by the center rivets, efficient filling of the structure is not possible. In any case such a filling process typically involves blowing the particulate sorbent material into the interspace and the cavity of the frame, assisted by shaking of the structure and/or other action allowing for settling of the particulate sorbent material in the cavities between the metal sheets and/or the tubes.

According to yet another preferred embodiment, said plurality of center rivet connections are arranged in a staggered arrangement avoiding that more than one or more than two center rivets are located in the same interspace of two adjacent metal sheets. Staggered in this sense means that said plurality of center rivet is not arranged along lines which run parallel to the corresponding running direction of the metal sheets, but along lines which are slightly tilted relative to the running direction of the metal sheets. Preferably the center rivet connections are arranged along lines along the general direction of the metal sheets and are inclined under an angle of at least more than 2° thereto but not more than 10° thereto. Further the center to center distance of neighboring rivets is preferably in the range of 2.5-20 cm or 5-20 cm, preferably, 7-12 or 8-10 cm.

Mutually adjacent and contacting layers of the stack can be pairwise held by horizontally extending support elements in particular at contacting edges of adjacent layers, wherein preferably, in particular at the upstream edges of the stack, the support element is provided with an aerodynamically shaped nose portion facing upstream (with respect to the inflow), and wherein further preferably the support element comprises a pair of outer leg portions running essentially parallel to the outer plane of the respective layer, and a central leg portion located in between. The mounting arrangement, which will be further detailed below, in a carbon dioxide capture unit is as such and independent of the frame structure according to claim 1 an inventive aspect.

Along the stack of layers the distance between adjacent layers can be varied taking account of the pressure drop profile of the inflow along a direction parallel to the direction of inflow. In case of a central inflow the distance (a) on the opening side between two adjacent layers of the stack is set at a given value (a) in the range of 8-230 mm, preferably in the range of 19.2-200 mm or 20-100 mm. The stack can be arranged such that the distance (a) between two adjacent layers increases outwardly to a value (c) within the range in the range of 8-230 mm, preferably in the range of 19-200 mm or 20-100.

Also it is possible to gradually increase the angle of the layers to a main horizontal axis of the unit, namely in case of a central inflow preferably this angle is gradually increasing from a value of around zero at the center to a value in the range of 0-20°, preferably in the range of 0.1-5°.

Typically, the proposed unit is located in a housing, said housing being preferably provided with turbulence reducing elements in particular upstream of the stack of layers.

Further the present invention relates to the use of a unit as described above for extracting carbon dioxide from air and/or flue gases and/or biogas and/or other $CO_2$-containing gas streams.

According to yet another preferred embodiment, the layers of the stack of at least two layers are held together in a housing by at least a pair of side walls.

The sidewalls can either be arranged pairwise vertically (in which case the frame elements are arranged essentially horizontally) or pairwise horizontally (in which case the frame elements are arranged essentially vertically).

On the side walls the lateral metal profiles are fixed by using a form fit connection, a force fit connection or by means of a closure by adhesive force. Preferably the side walls are provided with a pattern of fixing elements to allow for fixing the lateral metal profiles on the respective side wall in the desired relative positions. The corresponding patterning of the fixing elements is therefore adapted to the desired orientation of the frames in the stack. It is for example possible to structure the pattern such that the distance between adjacent frames varies along the stack, such that in the central portion the distance between adjacent frames is smaller than in the outside portions of the stack, as this is for example illustrated in FIG. 8 discussed further below.

The fixing elements provided on the sidewalls are preferably structured as holes, grooves, ribs, and/or studs.

In conjunction with such sidewalls further preferably the metal profiles themselves are provided with corresponding profile fixing elements, which can be distributed along the length of the metal profile. Preferably at least 3, more preferably at least 5 profile fixing elements can be provided on each metal profile. The profile fixing elements can be structured as holes, as blind rivet nuts, as studs, as a groove, or as a rib.

The sidewall is typically a metal plate with a thickness in the range of 2-10 mm. The sidewalls can be provided with bent over portions which are directed to the outside of the stack for further stabilization.

Using the sidewalls it is possible to provide for a separate stack unit which in itself is self standing and can be removably and/or exchangeably put into the actual housing which provides for the corresponding structure to withstand the vacuum which is applied in the typical cycle for the carbon dioxide separation. If the sidewalls are supplemented by a bottom wall and the top wall or plate, such as stack unit can be made essentially gas tight and sealed except for the inlet cross section and the outlet cross section allowing for a simplified structure also within the housing.

The use of such sidewalls to provide for a separate stack structure which can be put into the actual housing which is adapted for the vacuum cycles is as such an independent invention with its merits and advantages, in particular independent of the above-mentioned specific features of the layers with the circumferential frame structure etc., and as defined in claim 1 as filed.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings, FIG. 1 shows a schematic cut along a direction perpendicular to the running direction of the heat exchange tubes through a particulate sorbent structure layer element with heat exchange element;

FIG. 2 shows a schematic cut along a direction parallel to the running direction of the heat exchange tubes through the particulate sorbent structure layer element according to FIG. 1;

FIG. 3 shows a cross-section of an embodiment of a stack of layer elements with the corresponding airflow indicated;

FIG. 15 shows a perspective representation of the whole stack from the outflow side with left sidewall and frames in a) and in b) a cut along the lines A-A in a);

DESCRIPTION OF PREFERRED EMBODIMENTS

Figure 4:
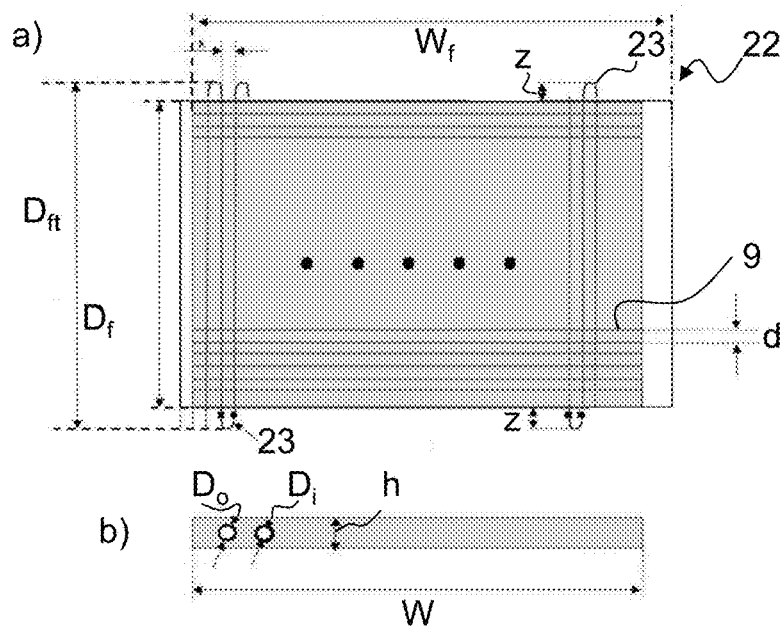
FIG. 4 shows in a) a top view onto a heat exchange element and in b) a cut perpendicular to the running direction of the tubes without the actual frame structure.

FIG. 1 shows a schematic cut through a particular absorbent structure layer element 5 in the horizontal orientation with heat exchange element, said cut being along a direction perpendicular to the running direction of the heat exchange tubes 11. FIG. 2 shows the corresponding cut in a direction perpendicular to the one as shown in FIG. 1. It should be noted that the running direction of the heat exchange element tubes 11 can also be different, i.e. it is also possible that the heat exchange element 22 is rotated by 90 degrees within the frame structure.

There is provided a rigid rectangular frame structure formed by two pairs of mutually parallel frame profiles 7' and 7". One first pair 7' is each provided as a U-shaped aluminum profile with the groove of the corresponding U-shape facing outwardly (see FIG. 1). So the two legs 8 of the corresponding profile 7 are facing outwardly and are arranged parallel to the main plane of the corresponding layer 5.

The other pair of frame profiles 7" as illustrated in FIG. 2 is located perpendicular to the first pair of profiles 7' is arranged such that the corresponding groove of the U-shaped profile is facing inwardly and is partly enclosing the heat exchange element 22 located in the interspace between the two pairs of frame profiles 7' and 7".

Between the two pairs of frame profiles or rather the four profiles and circumferentially enclosed thereby there is located the heat exchange element 22. This heat exchange element 22 in itself is a self-standing heat exchange element provided with a plurality of thermal transfer medium tubes 11 which are running parallel to each other and which are spaced from each other. Running perpendicular to these tubes 11 there is provided a plurality of metal sheets 9, which essentially extend over the full width and bridging almost the distance between the respective frame profiles 7, as can be seen in FIG. 1. These metal sheets 9 are provided each with a plurality of holes 10 through which the tubes penetrate. The metal sheets 9 as well as the tubes 11 are made of aluminum and the tubes 11 tightly fit into and contact the edges of the holes 10 so that there is a good thermal contact between the metal sheets 9 acting as thermal transfer elements and the tubing 11.

Each layer 5 comprises on its top side first a layer of wire grid 12 which is essentially touching the heat exchange element 22, or rather the edges of the plurality of metal sheets 9 thereof. On the outer side of this inner wire grid layer 12 there is provided a sheet of flexible fabric material, typically a non-woven PE material, which avoids that the sorbent material, which is also located in the interspace and surrounding the heat exchange element 22 is contained within the layer 5 but nevertheless the whole structure is air permeable.

Figure 6:
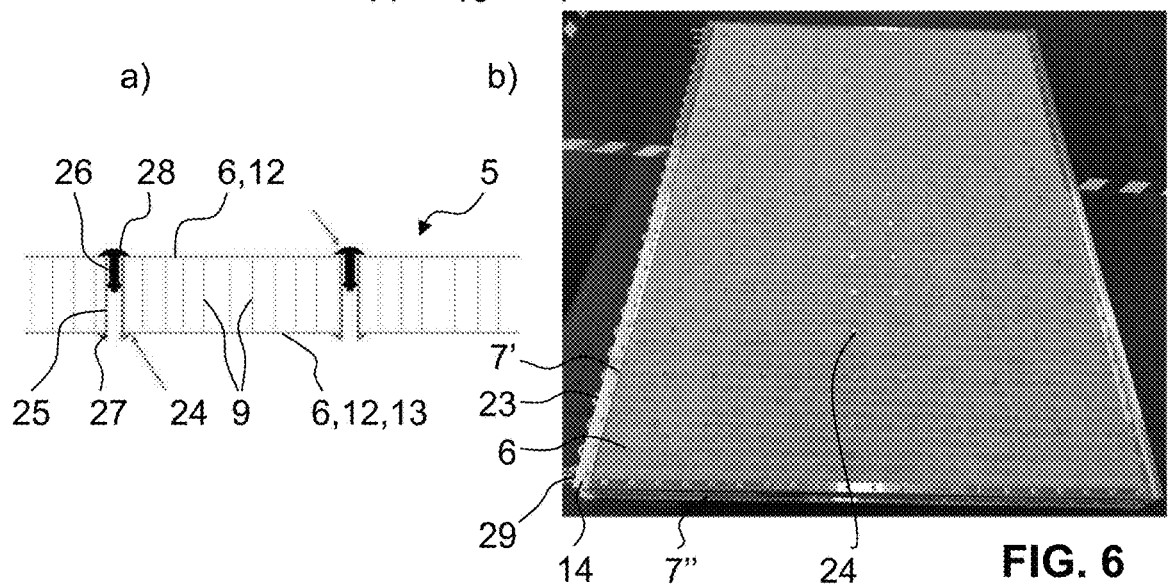
FIG. 6 in a) shows a cut in a direction perpendicular to the running direction of the metal sheets in the heat exchange element through a particulate sorbent structure layer element showing the center rivet arrangements penetrating the structure, in b) shows a perspective view onto one whole particulate sorbent structure layer element visualizing the placing of the center rivet elements, in c) shows the same as b) in a schematic representation from top and in d) shows a particulate sorbent material layer element with a denser rivet placing.
Figure 6:
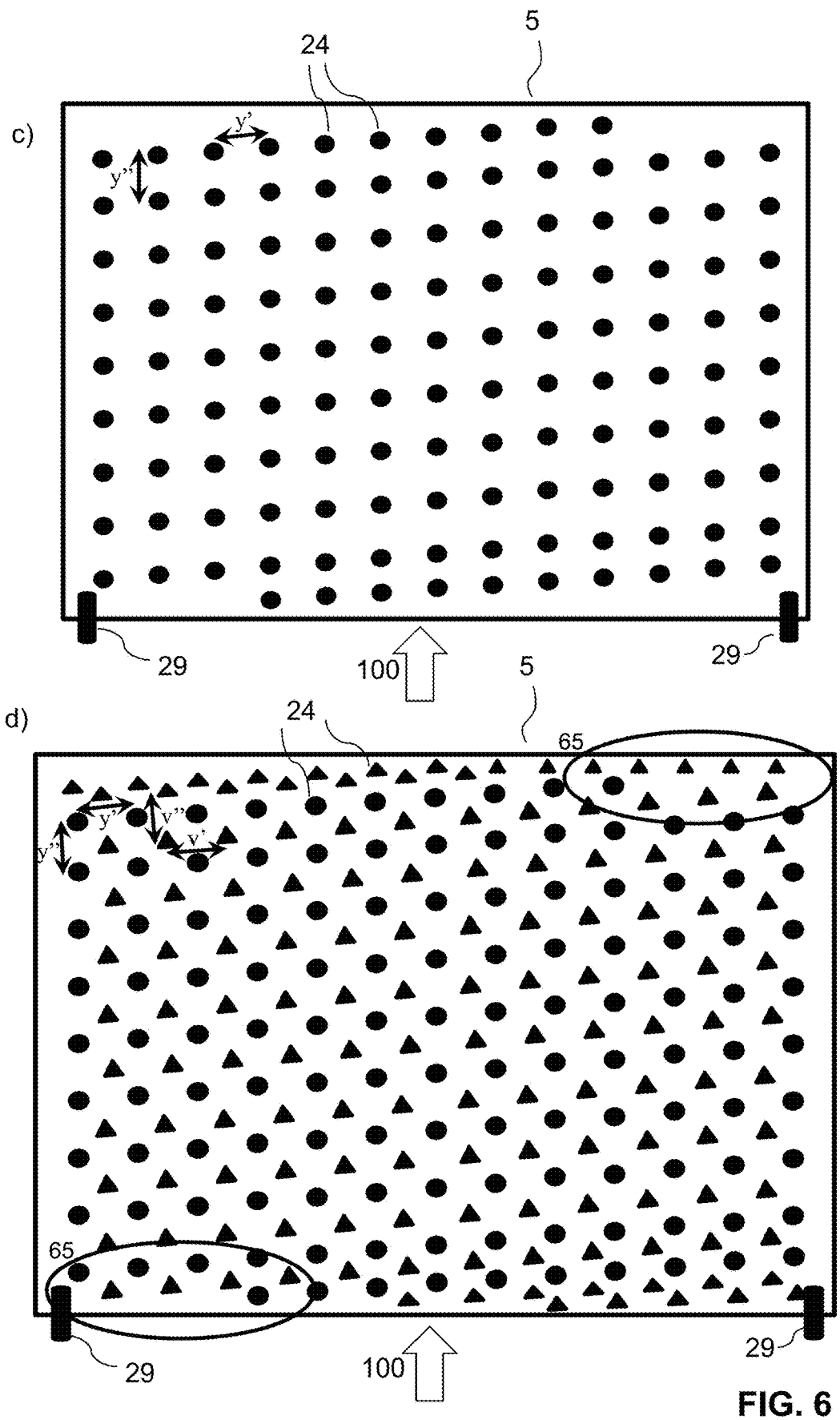

In this horizontal orientation, on the bottom side there is in addition provided a further outer wire grid layer 13 on the outer side of the respective flexible fabric material layer, avoiding sagging of the layers 6 and 12 on the bottom side. Further, this sagging is avoided by providing the penetrating center rivet connections as are illustrated in FIG. 6 and as will be detailed further below.

The aluminum tubes 11 are running parallel to each other, and at the terminal portions they are forming a U-shape in U-turns so that the thermal transfer medium is contained and guided in these tubes 11 in a meandering manner. Also the heat exchange element 22 in itself comprises a frame structure 21. This can be again a U-shaped frame structure as illustrated in FIGS. 1 and 2 and indicated with reference 21, however, in particular in the dimension as illustrated in FIG. 2 it is not necessary to have such a U-type structured frame element for the heat exchange element. It can there be sufficient to have on each side of the tubes 11 a slat which is directly contacting and attached to the corresponding tube 11. Also, it is possible that the U-shaped bent portions 23 of the tubes 11 are not located within the corresponding frame structure 21 but penetrate through such that the bent portions of the tubes 11 are located outside of the corresponding frame structure 21 of the heat exchange element.

The layers 6, 12 and 13 are attached to the legs 8 of the respective U-shaped frame profile by means of slats 14 and rows of rivets 15. The slats 14 extend over essentially the length of the corresponding U-shaped profile and between the respective slat and the leg 8 of the profile there is located the respective part of the flexible fabric layer 6 and of the wire grid layer 13 or 12/13. In order to have a sufficiently stiff slat structure, they have a thickness in the range of 0.5-2.5 mm and a width in the range of 5-15 mm in cross-section, and the rivet spacing along the profile is in the range of 3-15 cm, preferably in the range of 2-7 cm.

This provides for a simple manufacturing process in that in a first step the heat exchange element is provided, then the frame profiles 7' and 7" are built around and in the following step the inner grid 12 is laid onto the legs 8 of the profiles, subsequently the flexible fabric layer 12 is laid on top of this layer, and then under applying the required tension, in particular to the flexible fabric layer 12, the slats 14 are pressed against the legs 8 so as to maintain this tension and to clamp the layers, and subsequently the rivet connections 15 are generated along the length of the respective profile all along the circumference of the frame structure.

It should be noted that in these representations the actual sorbent material, so the fine particles which are provided with amine-functionality to chemically capture the carbon dioxide is not illustrated. In practice this fine particulate sorbent material is completely filling the cavity within the 2 outer flexible fabric layer 6 and the frame structure. Typically this sorbent material is introduced through at least one hole in the vertical wall joining the legs 8 of one of the profiles, typically of a profile of the type 7'. In this filling process, normally the whole frame is tilted such that this opening for the filling is facing upwards, and then under application of pressurized air carrying the sorbent material this is blown into the into spaces between the metal sheets 9 and the tubes 11. In order to achieve a dense packing of the small particles a careful filling process is important, as the packing of the metal sheets is quite dense.

Typically the width of such a frame $W_f$ is in the range of 1.4 m, and the depth $D_{ft}$ is in the range of 1 m, while the height of the frame is in the range of 20 mm, so the spacing between the flexible fabric layer 6 is in the range of 19 to 20 mm. The distance between adjacent tubes where they are running parallel is around 25 mm, and the distance between the metal sheets running parallel is around 5 mm. The thickness of the metal sheets is normally about 0.15 mm. The outer diameter of the tubes is normally around 10 mm, so that typically in the heat exchange element 22 there is a void fraction of 18-20%. The residual free flow through area is in the range of 55 to 60%. If the construction is made of aluminum (frame, slats, tubing, metal sheets, rivets) the thermal mass of an exchange element is in the range of 0.8-0.9 kJ/(K $kg_{sorbent}$). The maximum free heat length in the sorbent material is then around 5 mm.

For the flexible fabric layers a nonwoven polyester material of a thickness in the range of 0.15-0.2 mm is used, with an air permeability of around 3300 L/m2/s. For the metal grid a wire grid of aluminum is used with a wire spacing of around 1.15×1.35 mm. For both the inner and the outer metal grid 12 and 13, respectively the same type can be used.

One particular feature providing for optimum sealing and mechanical connection for adjacent layers 5 touching along one edge is also illustrated in FIG. 1. It is possible to have slats 16 of extended width (in a direction of the legs 8) extending beyond the edge of the legs 8 of the frame profile 7'. Likewise, it is possible to have also such wide slats which are however in addition to that provided with a sealing protrusion 17 having a groove 20 for receiving the protruding portion of the larger width slat 16.

How this can be used for sealing and attaching adjacent rigid frame structure or layers 5 is illustrated in FIG. 3. In this FIG. 3, a whole stack of such layers 5 is illustrated and it can be seen in the bottom arrangement of the lowermost tube layers that the protruding tongue of the wide slat 16 can be inserted into the groove 20 for easy sealing and mechanical attachment of adjacent layers.

Also illustrated in FIG. 3 is the main gas flow in such a stack. The gas inflow 1 enters the inlet gas channel 3 and subsequently the air penetrates through each of the layers and therefore through the heat exchange element and in particular through the bed of sorbent particles located in the interspace. Under the correspondingly chosen conditions of pressure, temperature and humidity, the carbon dioxide is captured normally by the amine functionalities located on the surface and/or in the porosity of the sorbent particles. It is to be noted again that the sorbent material is not specifically illustrated in FIGS. 1-3. After having passed through the corresponding layer under depletion of carbon dioxide, the air enters the downstream side of the respective layer, i.e. the gas outlet channel 4 before it is then exiting the system as the gas outflow 2.

A heat exchange element 22 is illustrated in a top view schematically in FIG. 4a and in a cut view in 4b. As one can see, in this embodiment the frame structure 21 of this heat exchange element 22 is arranged such that the U-turns 23 of the tubes 11 are located outside of the frame structure 21. Typically, the protruding length z of these U-turns of the tubes 11 is in the range of 5-30 mm. The distance between adjacent metal sheets 9 of the pack of parallel metal sheets in the heat exchange element is in the range of typically 4.8 mm, so these metal sheets are rather closely spaced in order to reach a low maximum free heat length in the sorbent material. The distance between adjacent metal sheets and also in the tubing is further carefully chosen such that the sorbent material can penetrate in the interspace and is still not pressed therein in a manner avoiding flow through of the air. On the other hand, the tubes are spaced by distance x, which is typically in the range of 25 mm.

The height of the corresponding metal sheets h is normally in the range of 3-50 mm, a good flow through can be made possible by having a height in the range of around 15-20 mm at the same time maintaining an optimum heat transfer and low thermal mass.

Figure 5:
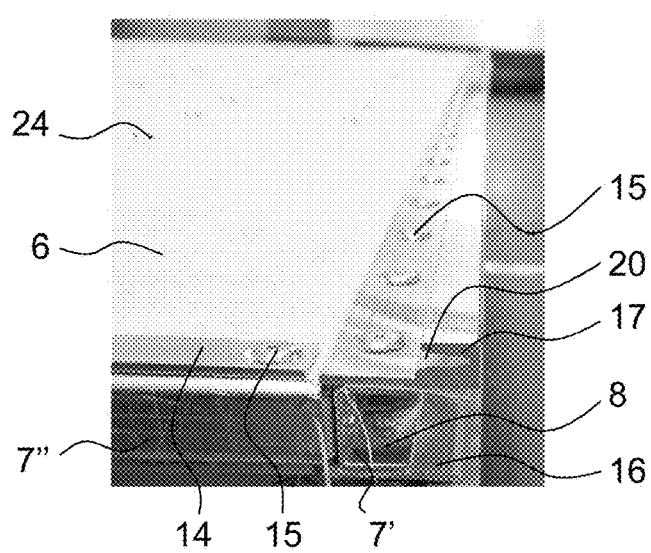
FIG. 5 shows a perspective view onto an edge portion of a particulate sorbent structure layer element.

An edge portion of a corresponding layer 5 is illustrated in FIG. 5. In this illustration the details of the protrusion 17 and of the wide slat 16 are shown and also how, according to this different embodiment, at the end the U-shaped profiles 7' and 7" are attached to each other.

In FIG. 6, the above mentioned center rivet connections are shown. In FIG. 6a a cut though the layer structure 5 is shown. As one can see, the central rivet connections each comprise a rivet tube 25 which fully penetrates the whole structure i.e. the flexible fabric sheet 6, the wire grid 12 on the top side, the metal sheets 9, and on the bottom side the layers 6, 12 and 13. The outer diameter of this rivet tube 25 is preferably chosen such that it is sufficiently smaller than the distance between adjacent metal sheets. The important aspect to watch out for is that the outer diameter of the rivet tube 25 is sufficiently small compared to the distance between metal sheets and compared to the average particle diameter of the particulate sorbent material so that the filing of the structure with particulate sorbent is possible without any blocking of the channels between adjacent metal sheet and the central rivet connections.

These rivet tubes 25 are inserted after an initial "drilling" or widening of a hole in a first manufacturing step, then the rivet tube 25 is inserted into these pretreated openings, and then from the other side a rivet pin 26 is inserted into the opening of the tube 25 and the rivet is fixed. Each, rivet tube 25 and rivet pin 25, are provided with a rivet head 27 and 28, respectively having a larger diameter than the outer diameter of the rivet tube, so that these head portions 27 and 28 provide a safe form fit connection of the layers 6, 12 and 13. The length of the rivet tube 25 should be adapted to essentially match the height h of the metal sheets.

FIG. 6c shows the particulate sorbent material 5 in a perspective view illustrating the rivet distribution. FIG. 6c shows the same in a schematic representation and illustrating the spacing y" of the rivets 24 in the longitudinal direction (essentially parallel to the main flow 100), and the spacing y' in the transverse direction (essentially perpendicular to the main flow 100). The values for y' and y" in this exemplary embodiment are set to 10 cm.

An alternative and denser rivet pattern is illustrated in FIG. 6d. In this embodiment the y' and y" spacing of the rivets 24 is set at 10 cm as in previous Figure. There is however provided an additional second group of rivets (illustrated by triangles as opposed to the circles representing the first group) with v' and v" spacing of these additional rivets 24 set at 10 cm shifted compared to y' and y" spacing. The effective maximum spacing between the rivets in this case is then 7.5 cm. In addition to that, extra rivets are provided in zones 65 to prevent bulging in zones where in the pattern according to FIG. 6c no rivets were present. In the zones 65 the maximum spacing of rivets 24 set at 5 cm improving stability of the layer and improving control over hole formation.

Figure 7:
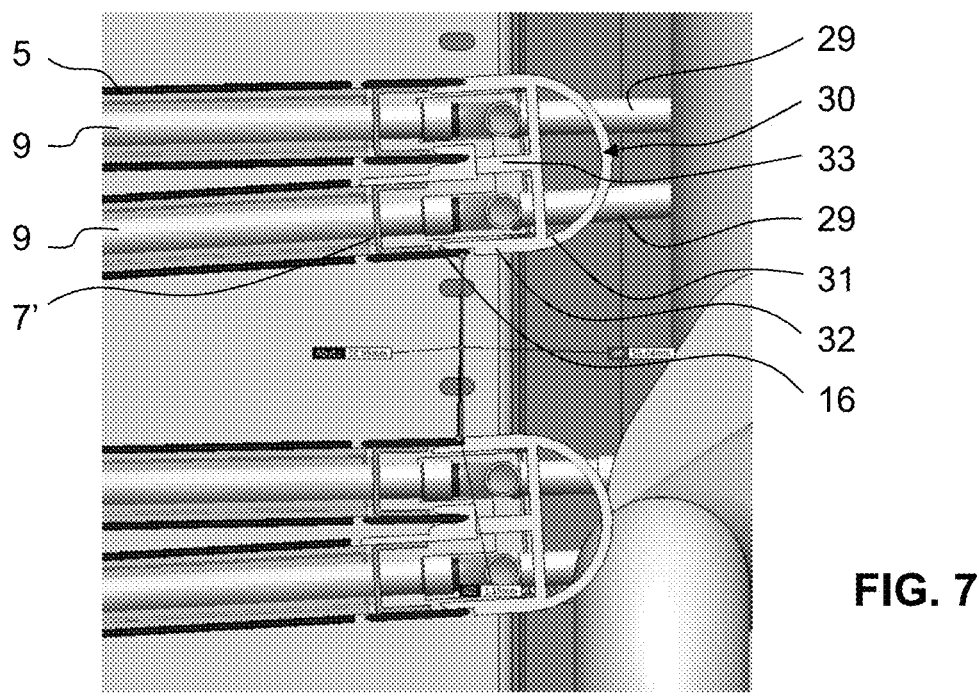
FIG. 7 shows a schematic cut through the mounting region of the layer elements at the upstream edge portion of a stack.

In FIG. 7 the tip portion of a stack of layers 5 is illustrated and in particular the corresponding support element 30 for attaching a layer 5 to a large frame structure of a housing in which the corresponding unit is arranged. These support elements 30 are provided as aerodynamic as well as mechanical construction elements. They comprise a round nose portion 31 which avoids turbulence and makes sure that the inflow and/or outflow, depending on the side, is essentially free from turbulences leading to a lower pressure drop across the whole structure.

On the opposite side, these support elements 30 are provided with a pair of outer legs 32, adapted to interact with a corresponding wide slat 16 of the corresponding layer. There is further provided a central inner leg portion 33 which can be used to abut with protrusion 17. As one can see from this figure, the respective arrangement of the wide slat 16 and of the extended portions 17 can also be different from the situation illustrated in FIGS. 1 and 3, so frame structures can be provided with pairs of wide slats on one side, as given in each of the top layers in the representation in FIG. 7.

Aerodynamic optimization of such a stack of layers 5 is important for making sure there is not too high a pressure drop across the whole structure. This can be achieved in that the layers 5 are arranged as illustrated in FIG. 8a. In this arrangement, in a central portion (central in respect of the vertical direction) the distance between adjacent layers 5 is chosen to be smaller (value a) than in the outer regions, so the value of a is smaller than the value of b and the value of b is smaller than the value of c. As a matter of fact in case of a central inflow 100 there is, in a direction perpendicular to this inflow, a pressure drop, i.e. the pressure drops as a function of the distance to the axis of the structure. Increasing the distance between adjacent layers towards the outer region takes this into account and avoids that individual layers are differently efficient and flown through by air to a significantly different extent depending on their vertical position. Further, in order to again avoid turbulences it is possible to provide in a corresponding widening wall portion 35 of the inflow duct 34 turbulence reducing elements 36 provided as smooth bulging elements with round edges. Typically in such a stack the distance a varies from small values of around 35 mm to large values c of 80 mm. A stack typically has 25-60 layers. Around 30 layers have been shown to be particularly efficient for direct air capture.

The upstream contact regions of the layers 5 can also be aerodynamically structured in that an upstream nose profiles 39 are provided. These can be combined with the structural elements holding the upstream edges of the layers 5 in place.

Figure 8:
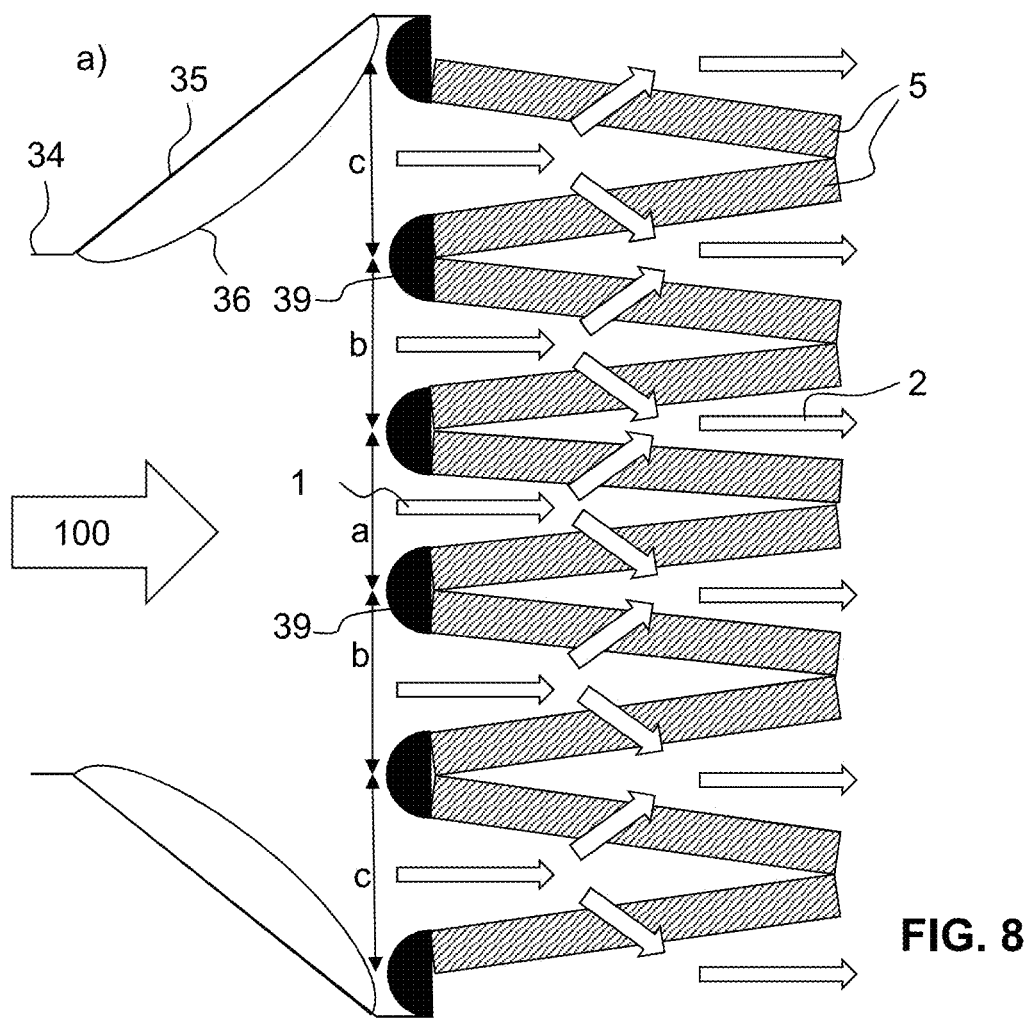
FIG. 8 a) shows a schematic illustration of a vertical cut through a whole stack with varying distance between the layer elements, b) a more detailed vertical cut through the inlet portion of the housing and c) a front view of the inlet portion of the housing.
Figure 8:
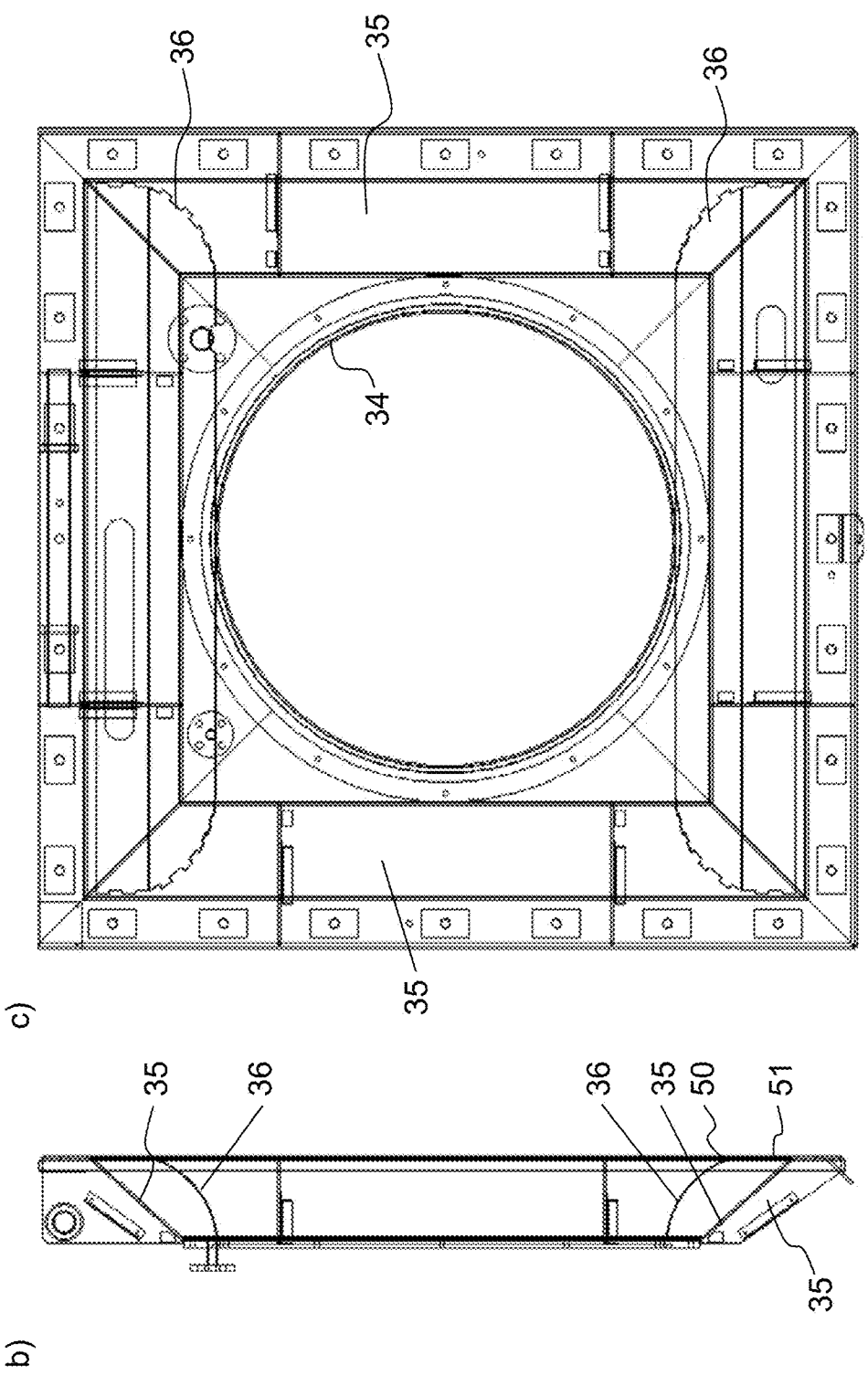

As illustrated in FIGS. 8 b and c the turbulence reducing elements 36 can be arranged so as to provide a smooth transition between the inflow duct 34 and the widening wall portion 35. The transition between 34 is such that the turbulence reducing elements 36 is tangential to the inflow duct 34. The downstream edge 50 of the shield 36 is not tangential to a radial portion 50 of the shield 36. The radius of the bent portion of the shield 36 is in the range of 100-300 mm, preferably around 200 mm.

Figure 9:
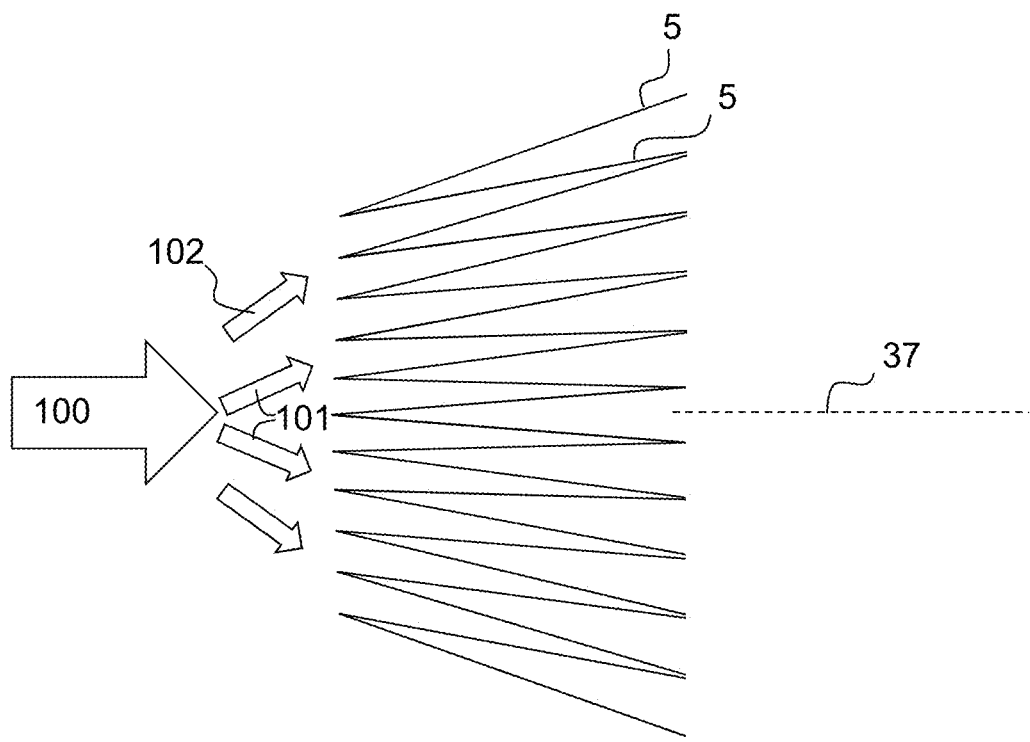
FIG. 9 shows a schematic illustration of a vertical cut through a whole stack with varying angle of the layer elements.

Another possibility for optimizing the efficiency and use of the corresponding layers 5 is schematically illustrated in FIG. 9. Apart from or in addition to changing the spacing between adjacent layers it is also possible to adapt their inclination angle relative to a central inflow direction 100. So the angle of the layer 5 relative to the central axis 35 of the arrangement can be chosen to increasingly larger outwardly.

Figure 10:
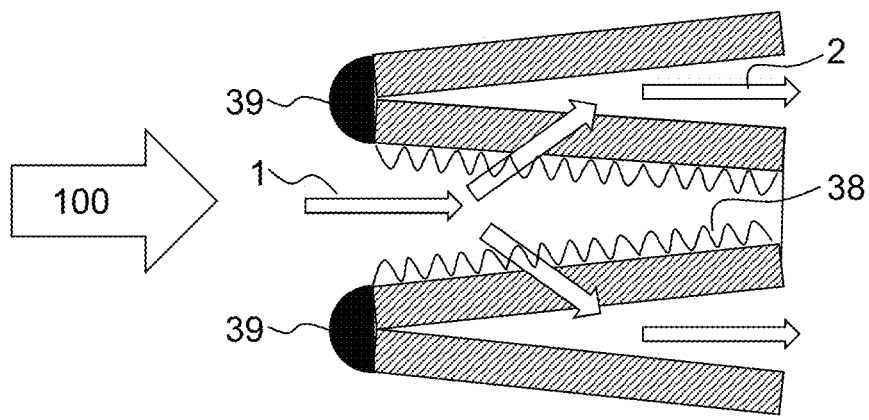
FIG. 10 shows a schematic illustration of a pleated filter material fabric attached to particulate sorbent layer element.

In FIG. 10, the implementation of a filter fabric material 38 is illustrated. In this embodiment, the filter material is pleated to increase the flow through area and reduce pressure drop and is attached to the inlet faces of the particulate sorbent layer elements 5. Apart from or in addition to change the spacing of the pleats, it is also possible to change their height and thusly influence the effective flow through area and correspondingly the pressure drop.

Figure 11:
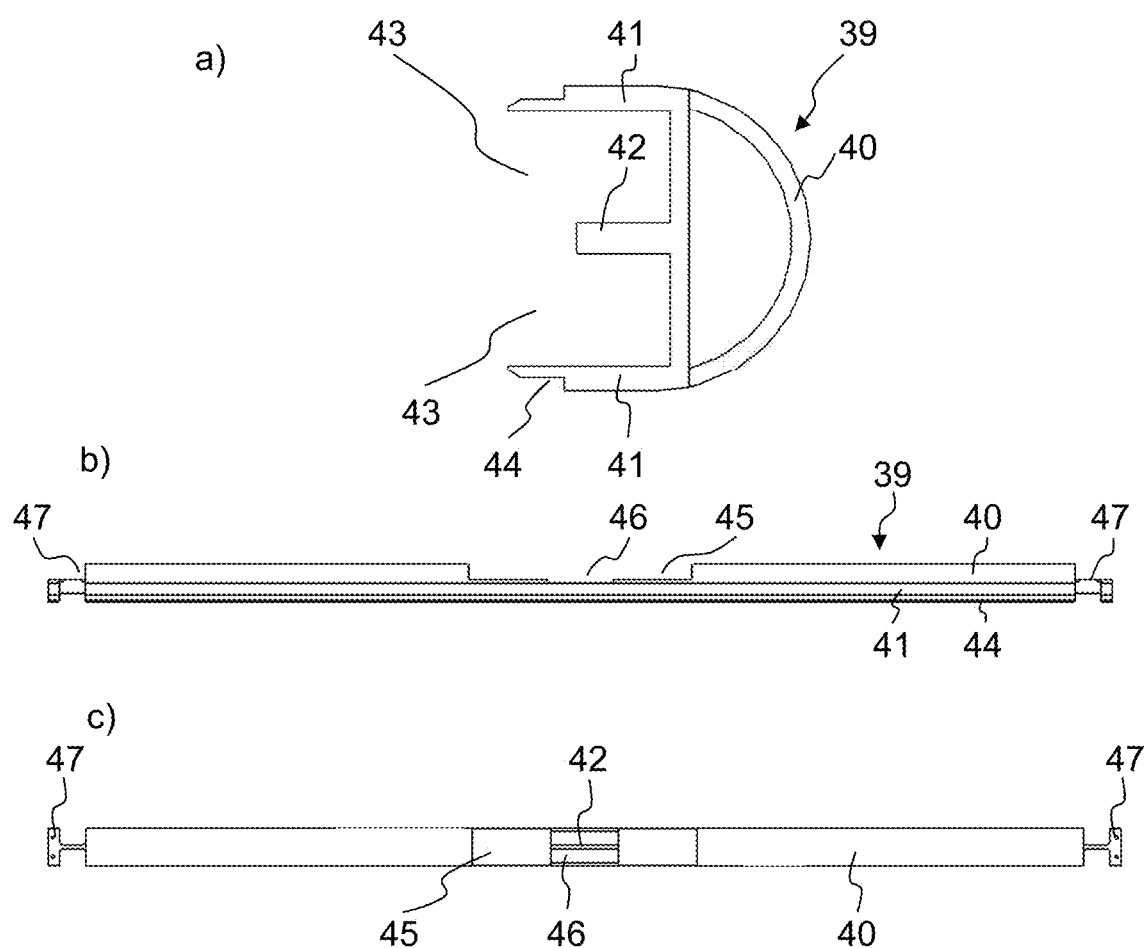
FIG. 11 shows in a) a cut though an upstream nose profile, in b) a top view and in c) a front view thereof.

FIG. 11 shows the upstream nose profile 39, having a rounded nose portion 40 facing the incoming air flow and two outer lateral legs 41 and a central leg 42. The radius of the nose profile is about twice the thickness of the frame construction. Between the legs 41 and 42 there is provided a slot 43 into which the frames of the adjacent layers 5 can be shifted and fastened therein. For improved fixing and smooth transitions between the frames and the profile 36 there can be provided recesses 44 in the legs 41. In order to allow for opening of the flap door of the housing without collision with the nose profiles, the profiles 39 can be provided with recesses 45 and 46. The profiles 39 are fastened to the housing by means of the outer fastening means 47.

Figure 12:
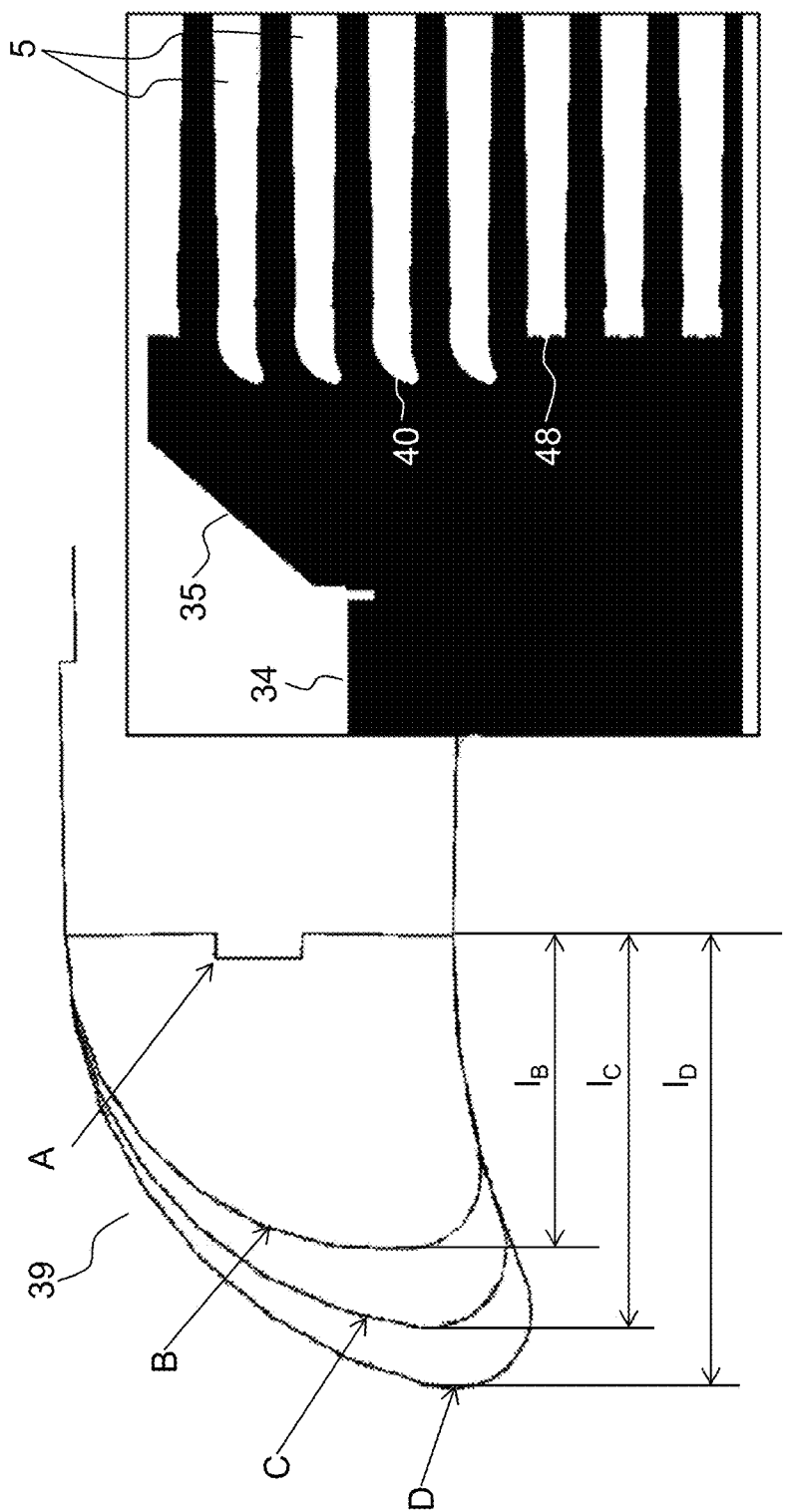
FIG. 12 shows a vertical axial cut through several different upstream nose profiles (left) and a stack with profiled upstream nose profiles in the outer regions of the stack (right)

As shown in FIG. 12 within the stack not all of the front portions need to have nose portion, e.g. in the central portion of the stack fastening rails without rounded nose portion 48 can be provided. In the outer region there can be provided rounded portions 40, wherein these can be, as given in the left portion of FIG. 12, of successively increasing or decreasing length, wherein the length of B can be around 40 mm, the length of C can be around 50 mm and the length of D can be around 58 or 60 mm.

Figure 13:
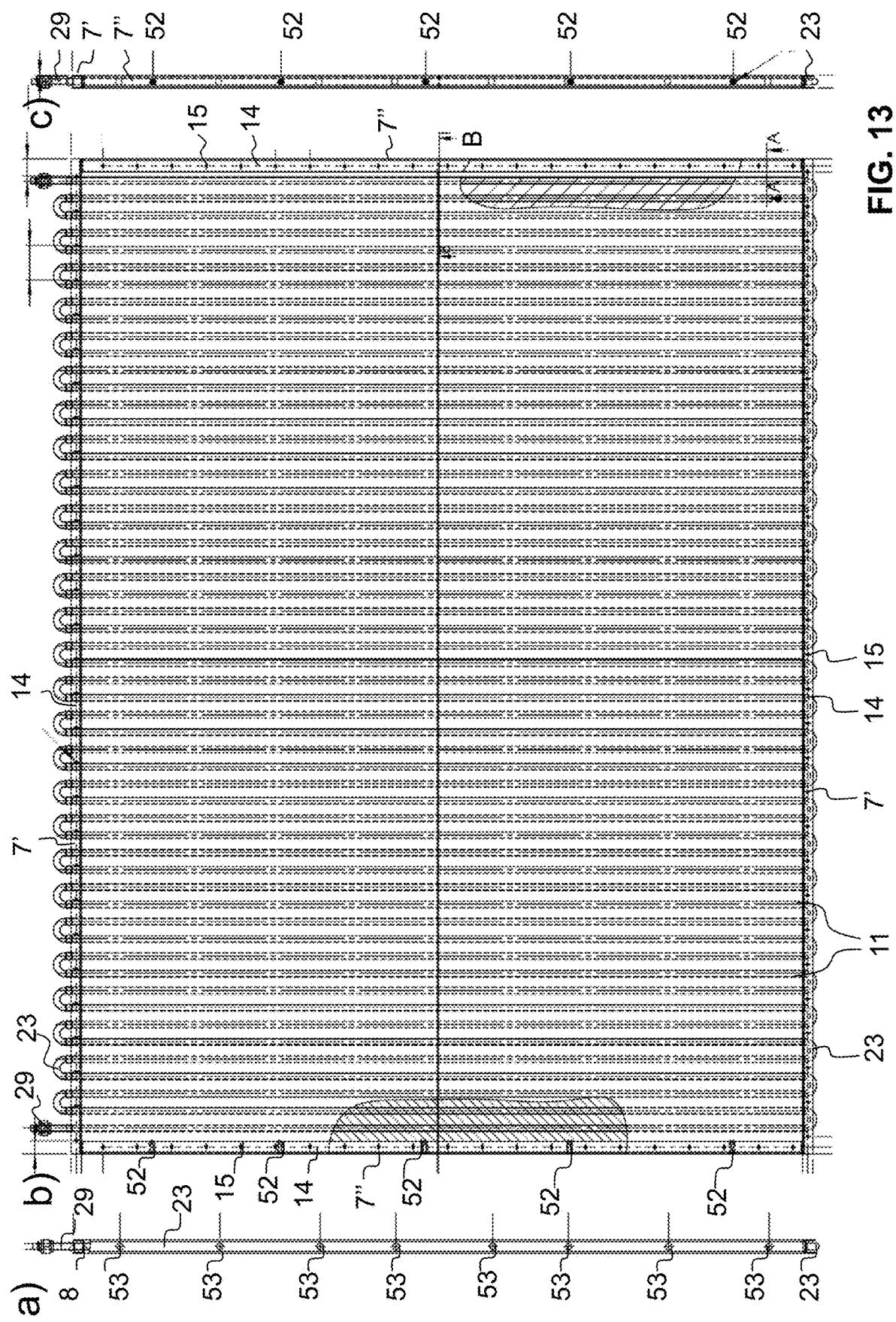
FIG. 13 shows a more detailed representation of a whole frame structure, wherein in a) a side view from a first lateral side (filling side, right edge in top view b), to be attached to a side wall) is shown, in b) a top view is shown (with omission of the heat exchange metal sheets/lamella for better visibility of the other structural elements), in c) a side view from a second lateral side (left edge in top view b), to be attached to a sidewall), in d) the cut along B-B are shown.
Figure 13:
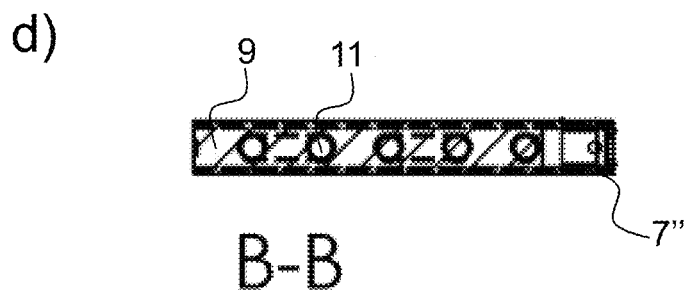

In FIG. 13 in somewhat more detail a frame structure is illustrated in various representations. The same reference numerals are used as in the other figures for the same or equivalent structural elements.

As one can see, the lateral frame elements 7" on the left and on the right side, respectively, are structured differently: For the filling of the frame with the sorbent one needs a sufficiently large number of holes in the corresponding frame element 7", while for fixing the whole frame on the sidewall of the stack (see FIG. 14), a smaller number is required.

Therefore, the frame element 7" on the left side in the representation according to b), which is illustrated in FIG. 13c), is only provided with 5 openings, into which closed blind rivet nuts 52 are inserted for fixing the frame on the respective sidewall.

On the other hand, the frame element 7" on the right side in the representation according to b), which is illustrated in FIG. 13a), is provided with 8 holes at the positions indicated with the reference 53 in the bridging part of the U-profile. These holes are used for filling the cavity of the frame with the sorbent. Due to the fact that the heat exchange metal sheets 9 do not extend fully up to the frame element 7", in an interspace parallel to the running direction of the frame element 7" the sorbent can be distributed over the various interspaces between the heat exchange metal sheets 9 by using a number of openings in the frame element 7" which is much smaller than the number of interspaces between the heat exchange metal sheets 9. Once the frame is filled with sorbent particles, the holes are closed with closed blind rivet nuts 53 as illustrated in FIG. 13a).

Depending on the needs these blind rivet nuts 53 can now be used for fixing the frame on the respective sidewall, which in this case will be the right side wall for the profile illustrated on the left side of FIG. 13b), since the upper side of the illustration in FIG. 13 is the inlet side and the lower side of the illustration in FIG. 13 is the outlet side of the usual frame mounting.

Figure 14:
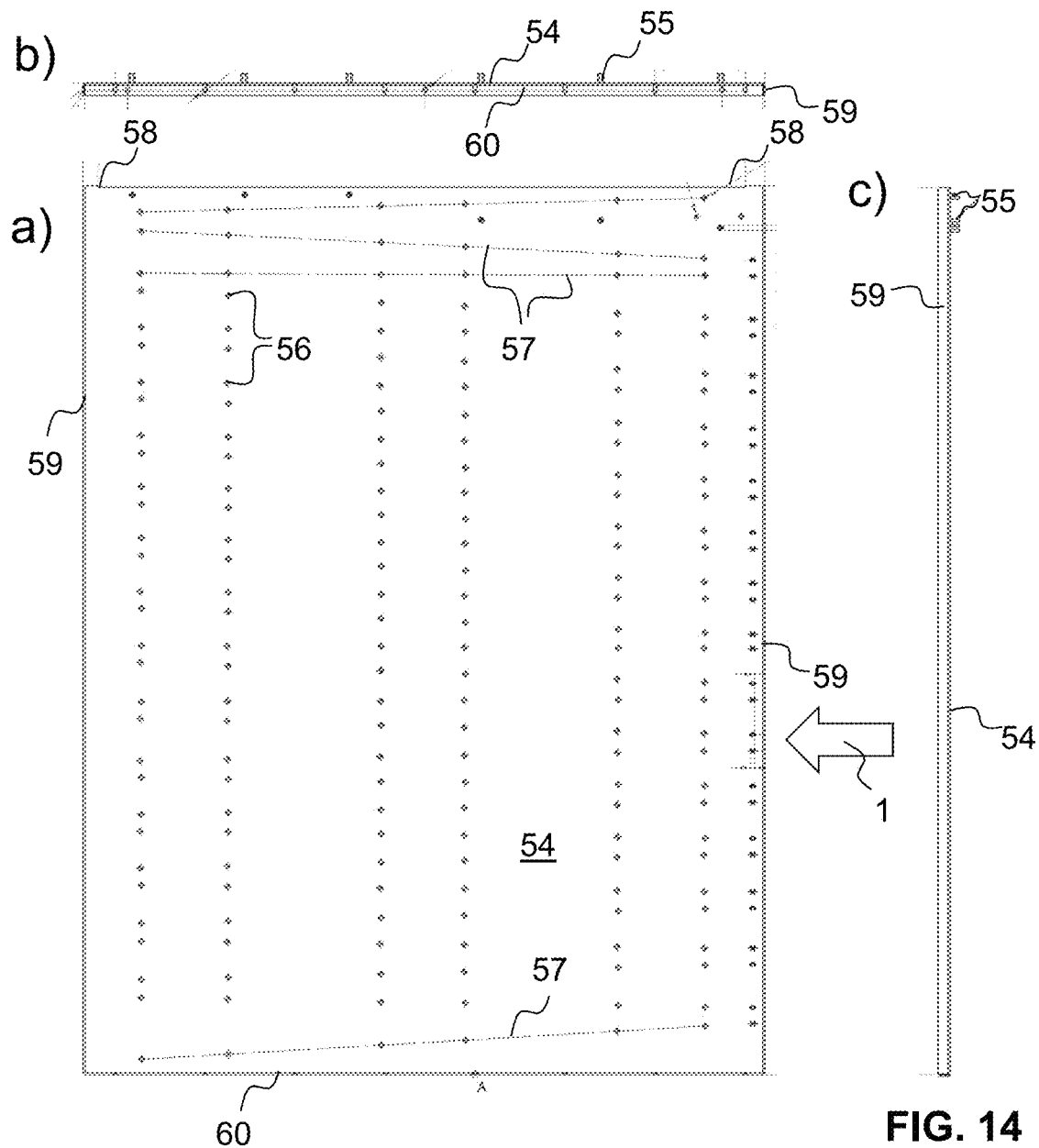
FIG. 14 shows the right side wall of a whole stack in a) in a side view from the inside of the stack, in b) in a top view and in c) in a front view.

FIG. 14 shows a sidewall for putting together a whole stack of frames. The sidewall illustrated in this figure is the right side wall of the stack, looking in the travel direction of the air, and in a) it is illustrated in view from the inside of the stack, in b) in a bottom view, and in c) in a view from the left side in figure a). The frame elements 7", which are illustrated in FIG. 13 b) on the right side, and in a), are being attached to this sidewall plate 54. In order to attach the individual frame elements to the sidewall corresponding holes 56 are provided in the respective positions. Not all of the blind rivet nuts 53 are used for the fixing of the frame on the sidewall. As a matter of fact, of the 6 possible blind rivet nuts 53 illustrated in FIG. 13 a) only 6 are used for attaching to the sidewall, namely the 3$^{rd}$ rivet nut 53 from the top and the 3$^{rd}$ rivet nut from the bottom is not used for fixing on the sidewall.

Schematic lines 57 indicate how the frame elements are mounted on the sidewall in a manner which is also illustrated in FIG. 3. One can also recognize in this FIG. 14 that the orientation and the spacing of the frame elements is structured such that in the center portion the stacking distance a as illustrated in FIG. 8 is smaller than in the top region and the bottom region of the stack (corresponding to the distance c illustrated in FIG. 8).

The sidewall plate 54 is also provided with bent over edges 59 on the two lateral sides and on the bottom side (bent over edge 60) for better stabilization of the side wall structure. The bent over edges 59 are pointing in an outward direction seen from the actual stack of frames. The width of these edges 59/60 is in the range of 20 mm. On the top of the plate there is no such edge but there is provided a cutout 58, into which the top cover plate can be placed in fixed to the corresponding side wall structure. To this end rivet nuts 55 are provided in the sidewall.

The corresponding sidewall on the left side is basically a mirror image of the sidewall illustrated in FIG. 14, however since the pattern of the attachment closed blind rivet nuts 52 is different on that side (see FIG. 13 c), the bore pattern is slightly different from the one illustrated in FIG. 14.

In FIG. 15 a) a perspective representation is given of a stack of frames now seen facing the flow direction of the air through the stack, so from the downstream side. The sidewall 54 visible on that representation is therefore the left side wall, which is also provided with bent over edges 59 and 56.

In a more detailed view in FIG. 15 b) a cut along the line A-A in figure a) is illustrated. As in FIG. 15a) the actual attachment screw (usually including a washer) for attaching the frames through the holes 56 to the sidewall 54 is not illustrated. However in FIG. 15 b) one can see how the heat exchange metal sheet 9 does not extend fully to the bottom of the U-profile of the frame element 7″, providing for the above mentioned possible distribution on filling with sorbent. On the other hand one can see that the blind rivet not 52 is located essentially parallel to the legs 8 of the profile 7″, and provides an inside threading for attachment through the bore 56 on the sidewall 54.

The arrangement given and shown in FIG. 15 using a sidewall according to FIG. 14 is for mounting a stack where the frames are arranged in an essentially horizontal direction. However, as pointed out above, the frames can also be mounted in a vertical direction, and in this case the sidewalls become top and bottom walls, respectively. In case of such a vertical arrangement also different attachment mechanisms for arranging the frame elements to form a stack are possible. For example it is possible to provide the bottom plate and the top plate in such a vertical arrangement with grooves in which the frame elements 7″ can be located, or into which these frame elements can be shifted in the mounting process. Also the inverse is possible, so it is possible to provide a groove in the respective frame elements 7″ and a corresponding rib on the respective top and bottom plate. Further it is possible to provide the bottom plate and the top plate with studs in the respective positions, and the frame elements 7″ are provided with rivet nuts, with or without internal threading. These rivet nuts can then be put onto the studs for attaching the respective frame to the top and bottom plate, respectively. Also the inverse is possible, so to have studs in the frame elements and bores or blind hole rivets in the top and bottom plate, respectively.

Figure 16:
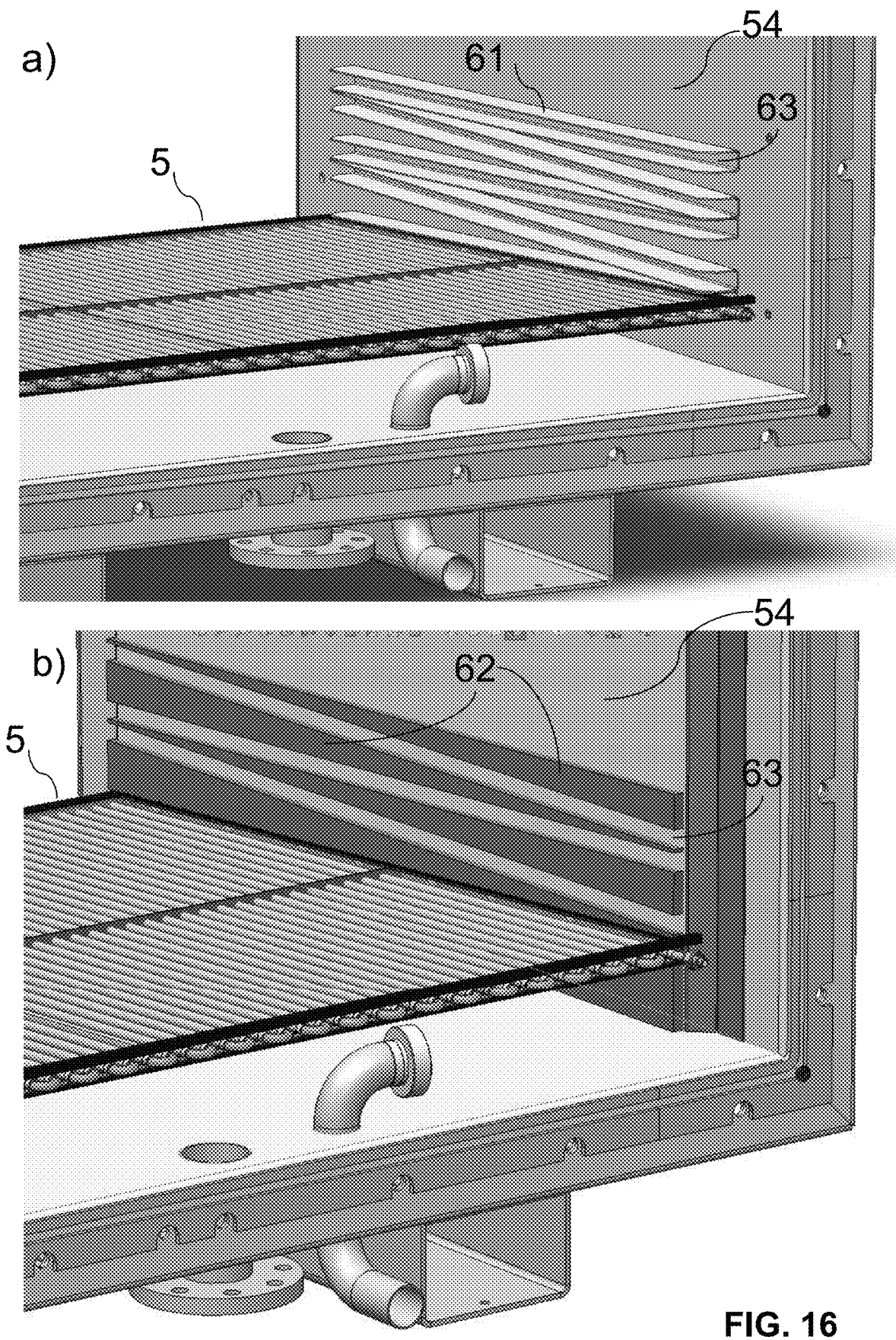
FIG. 16 shows an embodiment in a) in which the particulate sorbent material layer elements can be shifted into the frame of the stack by way of U-shaped profiles and in b) and embodiment by way of wedges.

For the maintenance of the corresponding structure it can be important to be in a position to swiftly replace the particulate sorbent material layers 5 for example for regeneration or a replacement of the sorbent material. According to a preferred embodiment therefore the particulate sorbent material layers 5 are removably mounted in the stack frame structure. This is illustrated in FIGS. 16 and 17.

In FIG. 16a) an embodiment of a drawer system, in which the particulate sorbent material layers 5 can be shifted into the frame like a drawer, is shown, where the sidewalls 54 are provided with U-shaped profiles firmly attached to the lateral walls 54 and providing for insertion grooves 63. The width of these insertion grooves 63 in a vertical direction is essentially the same or somewhat larger than the height of the corresponding particulate sorbent material layer 5. As in the previously illustrated examples, the layers 5 are oriented under inclination angles, so that inflow and outflow are optimized.

In FIG. 16b) an embodiment is shown, in which the interchangeable mounting of the layers 5 is realized by way of wedges 62 attached to the sidewalls 54. The wedges, which, in the longitudinal direction, are of opposite orientation, again provide for an arrangement of the layers 5 under inclination angles.

Figure 17:
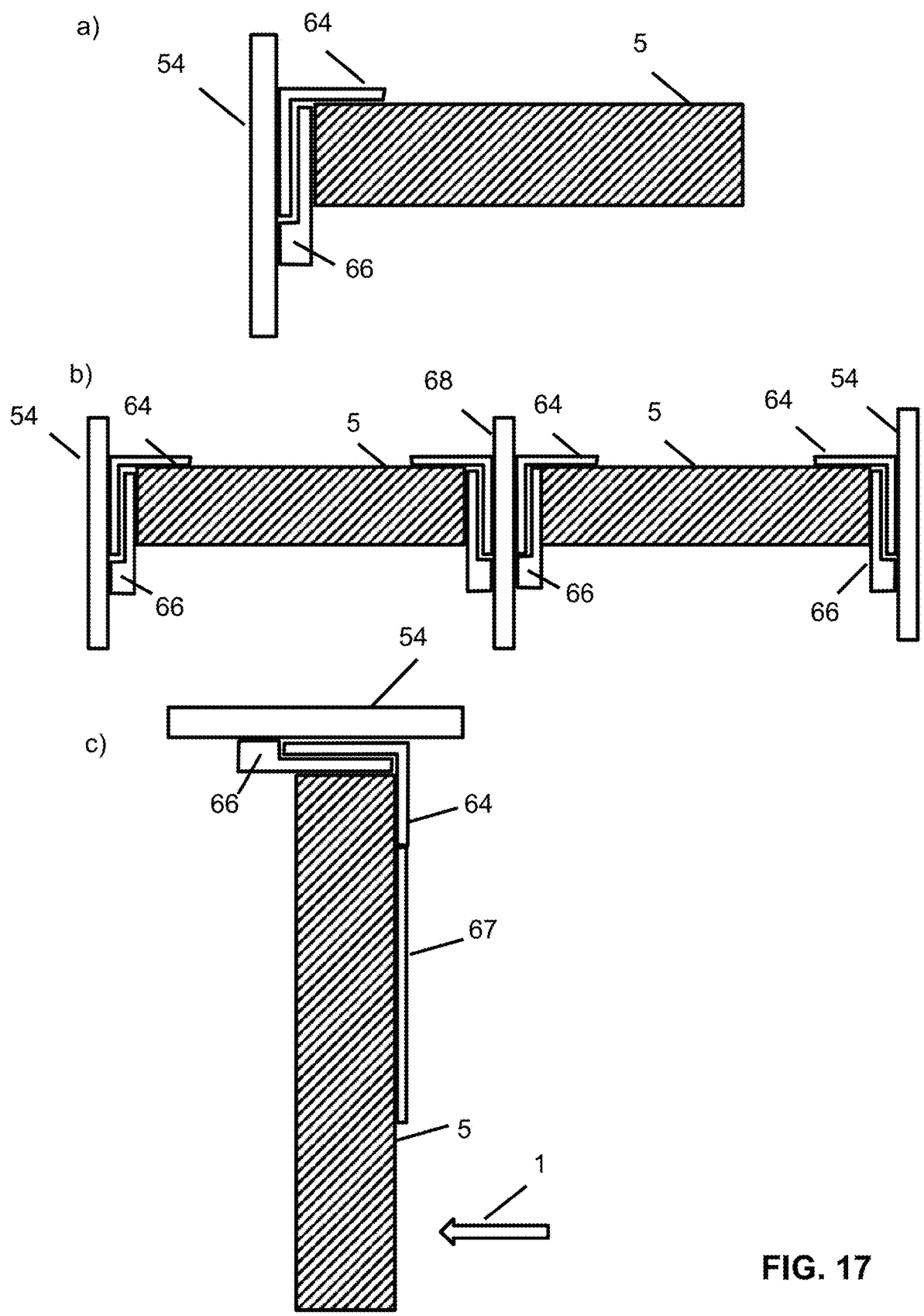
FIG. 17 shows an embodiment in a) in which the particulate sorbent material layer elements are in a horizontal position in the frame of the stack and can be shifted into the frame by way of a groove/tongue mechanism, in b) an embodiment in which within the frame of the stack in a transverse direction two particulate sorbent material layer elements are located next to each other, by way of a vertical separation wall, and in c) an embodiment in which the particulate sorbent material layer elements are in a vertical position in the frame of the stack and can be shifted into the frame by way of a groove/tongue mechanism.

In FIG. 17 an embodiment of a drawer system for the particulate sorbent material layers 5 is shown in a horizontal a) and a vertical c) orientation. The drawer tongue 64 is fixed to the particulate sorbent material layer 5 and slides in an element forming a drawer groove 66 fixed to the side wall of stack 54 enabling individual particulate sorbent material layers to be inserted and removed.

In the vertical orientation as illustrated in FIG. 17c, the particulate sorbent material layer 5 is further equipped with a covering plate 67 on the face of said sorbent material layer 5 facing the inflow gas stream 1 and affixed to the upper portion of said layer. In this manner, a physical barrier is realized which forces air flow through the sorbent material even in the event of compacting of the sorbent material and hole formation. In this manner bypassing can be prevented, maintaining a consistent flow and adsorption behavior.

In FIG. 17b two particle sorbent material layers 5 are shown in horizontal orientation placed on the same level of the stack each with a width $W_f$ half of the width $W_f$ of previous embodiments and held in placed by a supplementary separation wall 68 in addition to the side walls of the stack 54, each wall possessing in this case the same drawer tongue 64 and groove 66 allowing for insertion and removal of individual particulate sorbent material layers 5. The same structure can be placed in the vertical orientation with the corresponding covering plates 67 (as illustrated in c) placed on the face of the particulate sorbent material layer element 5 facing the inlet gas stream 1.

List of Reference Signs

| | |
|---|---|
| 1 | inlet gas stream, gas inflow, main gas inflow direction |
| 2 | outlet gas stream, gas outflow, main gas outflow direction |
| 3 | gas inlet channel |
| 4 | gas outlet channel |
| 5 | particulate sorbent material layer element |
| 6 | sheet of fabric material enclosing the sorbent material |
| 7 | part of a frame, defining the geometrical structure of a sorbent layer and supporting the fabric material enclosing the sorbent material |
| 8 | legs of 7 parallel to inlet face 18 |
| 9 | sheet of metal, heat exchange lamella |
| 10 | holes in 9 for 11 |
| 11 | tube containing/guiding a heat transfer fluid |

-continued

List of Reference Signs

| | |
|---|---|
| 12 | inner wire grid layer |
| 13 | outer wire grid layer |
| 14 | slat for attaching the layers |
| 15 | frame rivet |
| 16 | wide slat, tongue |
| 17 | sealing protrusion on 16 |
| 18 | inlet face |
| 19 | outlet face |
| 20 | groove for receiving 16 |
| 21 | frame structure of heat exchange element |
| 22 | heat exchange element |
| 23 | U turn of 11 |
| 24 | centre rivet |
| 25 | rivet tube of 24 |
| 26 | rivet pin of 24 |
| 27 | head of 25 |
| 28 | head of 26 |
| 29 | inlet/outlet tubing for heat exchange element |
| 30 | support element |
| 31 | round nose portion of 30 |
| 32 | outer leg portion of 30 |
| 33 | inner leg portion of 30 |
| 34 | inflow duct |
| 35 | widening wall portion of 34 |
| 36 | turbulence reducer at 35 |
| 37 | main horizontal axis of the whole unit |
| 38 | filter fabric material |
| 39 | upstream nose profile |
| 40 | round nose portion of 39 |
| 41 | outer leg portion of 39 |
| 42 | central leg portion of 39 |
| 43 | insertion slots of layers 5 |
| 44 | recessed portion of 41 |
| 45 | outer cut-out |
| 46 | inner cut-out |
| 47 | fastening elements of 39 |
| 48 | 39 without rounded nose portion |
| 50 | downstream edge of 36 |
| 51 | radial portion of 36 |
| 52 | closed blind rivet nut in frame 7" for fastening on side wall |
| 53 | closed blind rivet nut in frame element 7" in holes for filling with sorbent |
| 54 | side wall of stack (right side) |
| 55 | rivet nut in wall 54 |
| 56 | bores in side wall for 55 for fastening of frames on side wall |
| 57 | lines to indicate the mounting scheme of the frames on the side wall |
| 58 | cut-out for top cover plate |
| 59 | bent-over edge on lateral side |
| 60 | bent-over edge on bottom side |
| 61 | U-Profile on 54 |
| 62 | wedges on 54 |
| 63 | insertion groove for 5 |
| 64 | drawer tongue |
| 65 | extra rivets in border regions |
| 66 | drawer groove |
| 67 | covering plate |
| 68 | separation wall |
| 100 | main inflow |
| 101 | inflow into stack at central portions |
| 102 | inflow into stack at outer portions |
| A | 39 without rounded nose portion |
| B-D | 39 with successively increasing length nose portions |
| a | center frame stacking distance at the opening edge |
| b | middle frame stacking distance at the opening edge |
| c | outer frame stacking distance at the opening edge |
| d | distance between 9 |
| $D_o$ | outer diameter of 9 |
| $D_i$ | inner diameter of 9 |
| $D_{ft}$ | total frame depth |
| $D_f$ | frame depth |
| h | height of 9 |
| $l_{B-D}$ | lengths of B-D, respectively |
| w | width of 9 |
| $W_f$ | frame width |

-continued

List of Reference Signs

| | |
|---|---|
| v' | rivet spacing of second group of rivets in transverse direction |
| v" | rivet spacing of second group of rivets in longitudinal direction |
| y' | rivet spacing in transverse direction |
| y" | rivet spacing in longitudinal direction |
| x | distance between adjacent 9 |
| z | protrusion length of 23 |

The invention claimed is:

1. A gas separation unit for the separation of at least a first gas from a mixture containing said first gas as well as further gases different from the first gas by a cyclic adsorption/desorption process using a loose particulate sorbent material for gas adsorption, wherein said particulate sorbent material is arranged in at least two stacked layers, wherein each layer comprises two sheets of a flexible fabric material which is gas permeable but impermeable to the loose particulate sorbent material, wherein the sheets are:

arranged essentially parallel defining an inlet face of the layer and an outlet face of the layer, arranged with a distance between the sheets in the range of 0.3-5.0 cm, enclosing a cavity in which the particulate sorbent material is located, and mounted on a stiff rectangular circumferential frame structure, wherein said stiff rectangular circumferential frame structure is formed by four metal profiles arranged pairwise mutually parallel, said metal profiles having pairs of legs that are arranged essentially parallel to said inlet face of the layer and said outlet face of the layer, respectively, and allow for fixing said sheets circumferentially to said legs on each respective face, wherein a plurality of tubes for a heat exchange fluid is provided within said stiff rectangular circumferential frame structure and within said cavity, wherein the plurality of tubes, at least over non-bent portions thereof, are arranged essentially parallel to one first pair of said mutually parallel metal profiles and are in thermal contact with a plurality of sheets of metal, wherein the sheets of metal are arranged essentially perpendicular to a main plane of the frame and perpendicular to said tubes, and extend in a continuous manner between said first pair of mutually parallel metal profiles and are provided with a plurality of holes through which the plurality of tubes penetrate, wherein the unit has a gas inlet side or gas inlet manifold through which a gas inflow of the gas mixture enters the unit and a gas outlet side or gas outlet manifold through which a gas outflow exits the unit, a gas pathway between the inflow and the outflow being confined in the unit to pass through at least one layer, wherein said layers are arranged in the unit such that the gas inflow passes through the inlet face, subsequently through the particular sorbent material located in the cavity of the respective layer, and subsequently to exit the respective layer through the outlet face to form the gas outflow, wherein the layers are arranged such that inlet faces of adjacent layers are facing each other and enclose gas inlet channels, and such that outlet faces are facing each other and enclose gas outlet channels,
wherein a mean distance between inlet faces and/or outlet faces defining said channels, measured in a direction essentially perpendicular to a main gas inflow direction and a main gas outflow direction, respectively, is in the range of 0.5-15 cm,
wherein the total frame depth is in the range of 0.5-1.8 m and the frame width is in the range of 0.5-1.9 m, and
wherein the layers of the stack of at least two layers are held in place in a housing by at least a pair of side walls which are either arranged pairwise vertically or pairwise horizontally, and on which side walls elements are provided, which allow individual layers to be shifted into the housing in a replaceable manner.

2. The gas separation unit according to claim 1, wherein the flexible fabric material is fixed to the frame structure by means of slats, and wherein the flexible fabric material is sandwiched between the respective slat and the leg of the metal profile.

3. The gas separation unit according to claim 1, wherein the elements on the side walls are provided as at least one of: U-shaped profiles attached to the side wall; wedges attached to the side wall; groove elements attached to the side wall cooperating with tongue elements attached to the layer or to the lateral frame of the layer.

4. The gas separation unit according to claim 1, wherein pairs of adjacent frame structures are provided, at the facing edges contacting in use with in one case a tongue protrusion extending over the full width of the edge, and a corresponding counter profile providing a slot also extending over the full width of the edge, such that by inserting said tongue of one frame into said slot of the adjacent frame the adjacent frame elements are mechanically fixed as well as sealed relative to each other.

5. The gas separation unit according to claim 1, wherein the total frame depth is in the range of 0.75-1.25 m or 0.9-1.1 m and/or the frame width is in the range of 0.5-1.9 m or of 1.1-1.7 m.

6. The gas separation unit according to claim 1, wherein the tubes are metal tubes, including aluminium or copper tubes.

7. The gas separation unit according to claim 1, wherein the tubes where running parallel are spaced by a distance in the range of 10-168 mm.

8. The gas separation unit according to claim 1,
wherein the sheets of metal have a thickness in the range of 0.1-0.4 mm, or
wherein the sheets of metal have a height, measured perpendicular to the running direction of the tubes in the range of 3-50 mm.

9. The gas separation unit according to claim 1,
wherein the sheets of metal have a length being less than 20 mm shorter than the distance between the respective pair of metal profiles arranged pairwise mutually parallel forming said stiff rectangular circumferential frame structure, or
wherein the sheets of metal are made of aluminium, or
wherein the sheets of metal are spaced by a distance in the range of 1-15 mm.

10. The gas separation unit according to claim 1,
wherein the flexible fabric material is woven or nonwoven textile material, or
wherein the flexible fabric material has a thickness in the range of 0.1-4 mm, or
wherein the flexible fabric material, has a gas, or an air permeability in the range of 2500-50001/m2/s, or wherein at least the upstream layer of the flexible fabric material is chosen as a filter fabric material of at least M6 or at least F6 or at least F7 class according to DIN EN 779, or
wherein additional to the upstream layer of the flexible fabric material there is provided filter fabric material of at least M6 or at least F6 or at least F7 class.

11. The gas separation unit according to claim 1, wherein within the stiff rectangular circumferential frame structure there is provided a plurality of attachment elements, for holding at least said flexible fabric material layers together.

12. The gas separation unit according to claim 1, wherein the layers are arranged so that in one stack in a direction transverse to the inflow of air at one height at least two layers are arranged next to each other.

13. A method of using a unit according to claim 1 comprising:
extracting carbon dioxide from at least one of air or flue gases or biogas or other $CO_2$-containing gas streams.

14. The gas separation unit according to claim 1,
wherein the flexible fabric material is fixed to the frame structure by means of metal slats, extending essentially over the full-length of the respective metal profile, and
wherein the flexible fabric material and is sandwiched between the respective slat and the leg of the metal profile, and
wherein the slat is fixed to the respective leg by at least one, or a row of rivet joint connections.

15. The gas separation unit according to claim 1,
wherein pairs of adjacent frame structures are provided, at the facing edges contacting in use with in one case a tongue protrusion extending over the full width of the edge, and a corresponding counter profile providing a slot also extending over the full width of the edge, such that by inserting said tongue of one frame into said slot of the adjacent frame the adjacent frame elements are mechanically fixed as well as sealed relative to each other,
wherein said tongue protrusion is realized by means of a correspondingly structured wide slat at the same time used for fixing the flexible fabric material and, if present, additional grid structures to the leg of the corresponding metal profile, and/or
wherein said counter profile also comprises a slat which at the same time can be used for fixing the flexible fabric material to the leg of the corresponding metal profile of the adjacent frame.

16. The gas separation unit according to claim 1, wherein the tubes are aluminium or copper tubes, with an inner diameter in the range of 3-20 mm, or in the range of 5-12 mm, and with an outer diameter in the range of 4-24 mm, or in the range of 6.2-14 mm.

17. The gas separation unit according to claim 1, wherein the tubes where running parallel are spaced by a distance in the range of 15.5-98 mm.

18. The gas separation unit according to claim 1,
wherein the sheets of metal have a thickness in the range of 0.12-0.18 mm, or
wherein the sheets of metal have a height, measured perpendicular to the running direction of the tubes in the range of 8-22 mm.

19. The gas separation unit according to claim 1,
wherein the sheets of metal have a length being less than 5 mm shorter than the distance between the respective pair of metal profiles arranged pairwise mutually parallel forming said stiff rectangular circumferential frame structure, or wherein the sheets of metal are spaced by a distance in the range of 3.5-7 mm or 4-5.5 mm.

20. The gas separation unit according to claim 1, wherein the flexible fabric material is woven or nonwoven textile material based on metallic and/or fibres or yarns, respectively, or
wherein the flexible fabric material has a thickness in the range of 0.15-1 mm, or
wherein the flexible fabric material, has a gas, or an air permeability in the range of 3000-4000 l/2/s.

21. The gas separation unit according to claim 1, wherein within the stiff rectangular circumferential frame structure and across the heat exchange element as well as the layers of flexible fabric material, there is provided a plurality of attachment elements, said attachment elements being:
in the form of glue or weldings or soldering or center rivet connections, or
in the form of transverse or longitudinal slats affixed with at least one of these, for holding at least said flexible fabric material layers together.

22. The gas separation unit according to claim 1, wherein the layers are arranged vertically so that between the layers there are vertical slots, and wherein at the upper edges of the layers at least at the upstream side of the respective layer there is provided at least one horizontal covering plate covering the uppermost portion of the flexible fabric layer.

23. The gas separation unit according to claim 1, wherein the layers are arranged so that in one stack in a direction transverse to the inflow of air at one height at least two layers are arranged next to each other, held in place by way of the sidewalls and/or a vertical separation wall between the transversely adjacent layers.

24. The gas separation unit according to claim 1, wherein the layers of the stack of at least two layers are held in place or together in the housing by at least a pair of side walls which are either arranged pairwise vertically or pairwise horizontally, and on which side walls the lateral metal profiles are fixed, wherein the side walls are provided with a pattern of fixing elements to allow for fixing the lateral metal profiles on the respective side wall, wherein the fixing elements are structured as holes, grooves, ribs, and/or studs.

25. A gas separation unit for the separation of at least a first gas from a gas mixture containing said first gas as well as further gases different from the first gas by a cyclic adsorption/desorption process using a loose particulate sorbent material for gas adsorption,
wherein said particulate sorbent material is arranged in at least two stacked layers,
wherein each layer comprises two sheets of a flexible fabric material which is gas permeable but impermeable to the loose particulate sorbent material,
wherein the sheets are:
arranged essentially parallel defining an inlet face of the layer and an outlet face of the layer,
arranged with a distance between the sheets in the range of 0.3-5.0 cm,
enclose a cavity in which the particulate sorbent material is located, and
mounted on a stiff rectangular circumferential frame structure,
wherein said stiff rectangular circumferential frame structure is formed by four metal profiles arranged pairwise mutually parallel,
wherein said metal profiles have pairs of legs arranged essentially parallel to said inlet face of the layer and said outlet face of the layer, respectively, and allow for fixing said sheets circumferentially to said legs on each respective face,
wherein a plurality of tubes for a heat exchange fluid is provided within said stiff rectangular circumferential frame structure and within said cavity,
wherein the plurality of tubes, at least over non-bent portions thereof, are arranged essentially parallel to one first pair of said mutually parallel metal profiles and are in thermal contact with a plurality of sheets of metal,
wherein the sheets are arranged essentially perpendicular to a main plane of the frame and perpendicular to said tubes and extend in a continuous manner between said first pair of mutually parallel metal profiles and are provided with a plurality of holes through which the plurality of tubes penetrate,
wherein the unit has a gas inlet side or gas inlet manifold through which a gas inflow of the gas mixture enters the unit and a gas outlet side or gas outlet manifold through which a gas outflow exits the unit, a gas pathway between the inflow and the outflow being confined in the unit to pass through at least one layer,
wherein said layers are arranged in the unit such that the gas inflow passes through the inlet face, subsequently through the particular sorbent material located in the cavity of the respective layer, and subsequently to exit the respective layer through the outlet face to form the gas outflow,
wherein the layers are arranged such that inlet faces of adjacent layers are facing each other and enclose gas inlet channels, and such that outlet faces are facing each other and enclose gas outlet channels,
wherein a mean distance between inlet faces and/or outlet faces defining said channels, measured in a direction essentially perpendicular to a main gas inflow direction and a main gas outflow direction, respectively, is in the range of 0.5-15 cm,
wherein a total frame depth is in a range of 0.5-1.8 m and the frame's width is in a range of 0.5-1.9 m, and
wherein the layers are arranged vertically so that between the layers there are vertical slots.

26. The gas separation unit according to claim 25, wherein the layers of the stack of at least two layers are held in place or together in a housing by at least a pair of side walls which are either arranged pairwise vertically or pairwise horizontally, and on which side walls a lateral metal profiles are fixed.

* * * * *